United States Patent
Ngo et al.

(10) Patent No.: US 10,185,683 B2
(45) Date of Patent: Jan. 22, 2019

(54) BUS INTERFACE SYSTEM

(71) Applicant: RF Micro Devices, Inc., Greensboro, NC (US)

(72) Inventors: Christopher Truong Ngo, Queen Creek, AZ (US); Alexander Wayne Hietala, Phoenix, AZ (US); Christian Rye Iversen, Vestbjerg (DK); Ruediger Bauder, Feldkirchen-Westerham (DE)

(73) Assignee: Qorvo US, Inc., Greensboro, NC (US)

( * ) Notice: Subject to any disclaimer, the term of this patent is extended or adjusted under 35 U.S.C. 154(b) by 649 days.

(21) Appl. No.: 14/575,491

(22) Filed: Dec. 18, 2014

(65) Prior Publication Data

US 2015/0169482 A1    Jun. 18, 2015

Related U.S. Application Data

(60) Provisional application No. 61/953,251, filed on Mar. 14, 2014, provisional application No. 61/917,610, filed on Dec. 18, 2013.

(51) Int. Cl.
*G06F 13/00* (2006.01)
*G06F 13/362* (2006.01)
*G06F 13/42* (2006.01)

(52) U.S. Cl.
CPC ...... *G06F 13/3625* (2013.01); *G06F 13/4278* (2013.01); *Y02B 60/1228* (2013.01);
(Continued)

(58) Field of Classification Search
CPC ........ G06F 13/36; G06F 13/38; G06F 13/385; G06F 13/40; G06F 2213/0016;
(Continued)

(56) References Cited

U.S. PATENT DOCUMENTS 3,953,835 A    4/1976 Cuccio et al.
5,787,132 A *  7/1998 Kishigami et al. ..... H04L 7/042
                                                    75/354
(Continued)

OTHER PUBLICATIONS

Author Unknown, "1-Wire," Wikipedia, last modified Jan. 16, 2015, accessed Feb. 12, 2015, http://en.wikipedia.org/wiki/1-Wire, 4 pages.
(Continued)

*Primary Examiner* — Tim T Vo
*Assistant Examiner* — Kim T Huynh
(74) *Attorney, Agent, or Firm* — Withrow & Terranova, P.L.L.C.

(57) ABSTRACT

A bus interface system is disclosed that includes a master bus controller and a slave bus controller that are coupled by a bus line. The slave bus controller includes a decoder that allows for data to be transmitted along just the bus line. The decoder includes an oscillator, a first counter, and a comparison circuit. The oscillator is configured to be enabled by data pulses defined by the input data signal and generate oscillation pulses while enabled. The first counts the oscillation pulses and indicates a number of the oscillation pulses generated during a time slot. The comparison circuit is configured to this number with a reference number and generate a data output that represents a first logical value in response to the number being greater than the reference parameter and represents a second logical value in response to the number being less than the reference parameter.

30 Claims, 11 Drawing Sheets

(52) U.S. Cl.
 CPC ........... *Y02B 60/1235* (2013.01); *Y02D 10/14* (2018.01); *Y02D 10/151* (2018.01)
(58) Field of Classification Search
 CPC ..... G06F 2213/0024; G06F 2213/0026; G06F 13/4004; G06F 13/4027; G06F 2213/4002; G06F 12/0835; H04L 12/40052; H04L 2012/4026
 USPC .......................................... 710/110, 305–306
 See application file for complete search history.

(56) References Cited

U.S. PATENT DOCUMENTS

| | | | |
|---|---|---|---|
| 6,408,163 | B1 | 6/2002 | Fik |
| 7,685,320 | B1 | 3/2010 | Wishneusky |
| 9,430,321 | B2 | 8/2016 | Slik |
| 9,519,612 | B2 | 12/2016 | Hietala et al. |
| 2001/0050713 | A1 | 12/2001 | Kubo et al. |
| 2004/0100400 | A1 | 5/2004 | Perelman et al. |
| 2004/0128594 | A1 | 7/2004 | Elmhurst et al. |
| 2004/0221067 | A1 | 11/2004 | Huang et al. |
| 2005/0012492 | A1 | 1/2005 | Mihalka |
| 2006/0050694 | A1 | 3/2006 | Bury et al. |
| 2006/0152236 | A1* | 7/2006 | Kim ................. G01R 31/31708 324/750.3 |
| 2006/0236008 | A1 | 10/2006 | Asano et al. |
| 2009/0248932 | A1 | 10/2009 | Taylor et al. |
| 2011/0035632 | A1 | 2/2011 | Hong et al. |
| 2012/0030753 | A1 | 2/2012 | Bas et al. |
| 2012/0226965 | A1 | 9/2012 | Hammerschmidt et al. |
| 2013/0054850 | A1 | 2/2013 | Co |
| 2013/0124763 | A1 | 5/2013 | Kessler |
| 2013/0132624 | A1 | 5/2013 | Chen et al. |
| 2013/0197920 | A1 | 8/2013 | Lesso et al. |
| 2013/0265884 | A1 | 10/2013 | Brombal et al. |
| 2014/0376278 | A1 | 12/2014 | Fornage et al. |
| 2015/0074306 | A1 | 3/2015 | Ayyagari et al. |
| 2015/0106541 | A1 | 4/2015 | Southcombe et al. |
| 2015/0127862 | A1 | 5/2015 | Fan et al. |
| 2016/0124892 | A1 | 5/2016 | Amarilio et al. |

OTHER PUBLICATIONS

Author Unknown, "DS1822: Econo 1-Wire Digital Thermometer," Maxim Integrated, 2007, 21 pages.
Author Unknown, "MAXIM 1-Wire® Tutorial," MAXIM, online audiovisual presentation, 17 slides, No Date, accessed Feb. 12, 2015, http://www.maximintegrated.com/products/1-wire/flash/overview/ (38 images of slides).
Awtry, Dan, et al., "Design Guide v1.0," Springbok Digitronics, Aug. 19, 2004, 96 pages.
Non-Final Office Action for U.S. Appl. No. 14/659,292, dated Sep. 29, 2017, 27 pages.
Non-Final Office Action for U.S. Appl. No. 14/659,328, dated Sep. 8, 2017, 51 pages.
Non-Final Office Action for U.S. Appl. No. 14/659,355, dated Sep. 20, 2017, 32 pages.
Non-Final Office Action for U.S. Appl. No. 14/659,371, dated Sep. 25, 2017, 23 pages.
Final Office Action for U.S. Appl. No. 14/659,379, dated Oct. 18, 2017, 44 pages.
Non-Final Office Action for U.S. Appl. No. 14/659,379, dated Apr. 7, 2017, 37 pages.
Final Office Action for U.S. Appl. No. 14/659,292, dated Apr. 30, 2018, 24 pages.
Final Office Action for U.S. Appl. No. 14/659,328, dated Mar. 20, 2018, 61 pages.
Final Office Action for U.S. Appl. No. 14/659,355, dated Apr. 17, 2018, 11 pages.
Final Office Action for U.S. Appl. No. 14/659,371, dated May 3, 2018, 21 pages.
Advisory Action for U.S. Appl. No. 141/659,379, dated Feb. 26, 2018, 3 pages.
Notice of Allowance for U.S. Appl. No. 14/659,379, dated Mar. 20, 2018, 10 pages.
Notice of Allowance for U.S. Appl. No. 14/659,328, dated Jul. 2, 2018, 8 pages.
Advisory Action for U.S. Appl. No. 14/659,355, dated Jul. 5, 2018, 3 pages.
Advisory Action for U.S. Appl. No. 14/659,371, dated Aug. 1, 2018, 3 pages.
Non-Final Office Action for U.S. Appl. No. 15/467,790, dated Jun. 28, 2018, 14 pages.
Ex Parte Quayle Action for U.S. Appl. No. 15/365,315, dated Jul. 26, 2018, 7 pages.
Advisory Action for U.S. Appl. No. 14/659,292, dated Aug. 10, 2018, 3 pages.
Notice of Allowance for U.S. Appl. No. 15/472,756, dated Aug. 8, 2018, 8 pages.
Notice of Allowance and Examiner-Initiated Interview Summary for U.S. Appl. No. 15/365,315, dated Sep. 14, 2018, 9 pages.
Non-Final Office Action for U.S. Appl. No. 14/659,355, dated Oct. 12, 2018, 8 pages.
Final Office Action for U.S. Appl. No. 15/467,790, dated Nov. 5, 2018, 15 pages.
Non-Final Office Action for U.S. Appl. No. 15/443,236, dated Nov. 16, 2018, 19 pages.

\* cited by examiner

BUS INTERFACE SYSTEM

RELATED APPLICATIONS

This application claims the benefit of provisional patent application Ser. No. 61/917,610; filed Dec. 18, 2013, which is hereby incorporated by reference in its entirety. This application further claims the benefit of provisional patent application Ser. No. 61/953,251, filed Mar. 14, 2014, which is hereby incorporated by reference in its entirety.

FIELD OF THE DISCLOSURE

This disclosure relates generally to digital bus interfaces.

BACKGROUND

Digital bus interfaces are used to communicate data between components within an electronic device, such as a computer, a radio frequency (RF) front-end module, a cellular telephone, a tablet, a camera, and/or the like. The digital bus interface generally includes at least one master bus controller and one or more slave bus controllers. The master bus controller(s) and the slave bus controller(s) are connected by bus lines and the master bus controller coordinates the transfer of data along the bus lines. The slave bus controllers perform commands (e.g., read and write commands) as coordinated by the master bus controller. If more than one master bus controller is provided, a bus arbitration scheme is generally implemented to negotiate between the various master bus controllers. The bus lines that connect the master bus controller(s) to the slave bus controllers typically include one or more data, power, and clock bus lines. Generally, the size of the digital bus interface increases as more bus lines are provided in the digital bus interface. The increase is due to the number of wires which must be routed between the bus controllers and the number of pins for the bus controllers that must be dedicated to the bus lines. In modern communication systems, the area available for pins and wires is minimal.

Therefore, digital bus interface designs that utilize fewer bus lines are needed.

SUMMARY

Embodiments of a bus interface system and methods of operating the same are disclosed. The bus interface system includes a master bus controller and a slave bus controller that are coupled by a bus line. In some embodiments, no other bus lines are provided so that the bus interface system provides a single-wire bus interface system. In order for the master bus controller to communicate with the slave bus controller, the slave bus controller includes a decoder. The decoder includes an oscillator, a first counter, and a comparison circuit. The oscillator is operable to receive an input data signal along the bus line from the master bus controller. To represent data, the input data signal defines data pulses during time slots. The oscillator is configured to be enabled by the data pulses of the input data signal and generate oscillation pulses while enabled.

The first counter is operable to store a first count parameter. To determine a logical value represented by one of the data pulses, the first counter is configured to count the oscillation pulses such that the first count parameter indicates a number of the oscillation pulses generated during the time slot as a result of the data pulse. The number of oscillation pulses thus indicates how the input data signal provided the data pulse. The comparison circuit is configured to compare the first count parameter with a reference parameter that indicates a reference number. The comparison circuit is configured to generate a data output that represents a first logical value (e.g., a bit value of 1) in response to the first count parameter being greater than the reference parameter. The comparison circuit is also configured to generate the data output so that the data output represents a second logical value (e.g., a bit value of 0) in response to the first count parameter being less than the reference parameter. In this manner, the decoder allows for data to be transmitted to the slave bus controller using just the bus line. Some embodiments of the slave bus controller further include a power conversion circuit configured to covert the input data signal into a supply voltage that powers the decoder. In this manner, embodiments of the bus interface system may provide a one wire bus interface system that only uses the bus line and no other bus lines.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
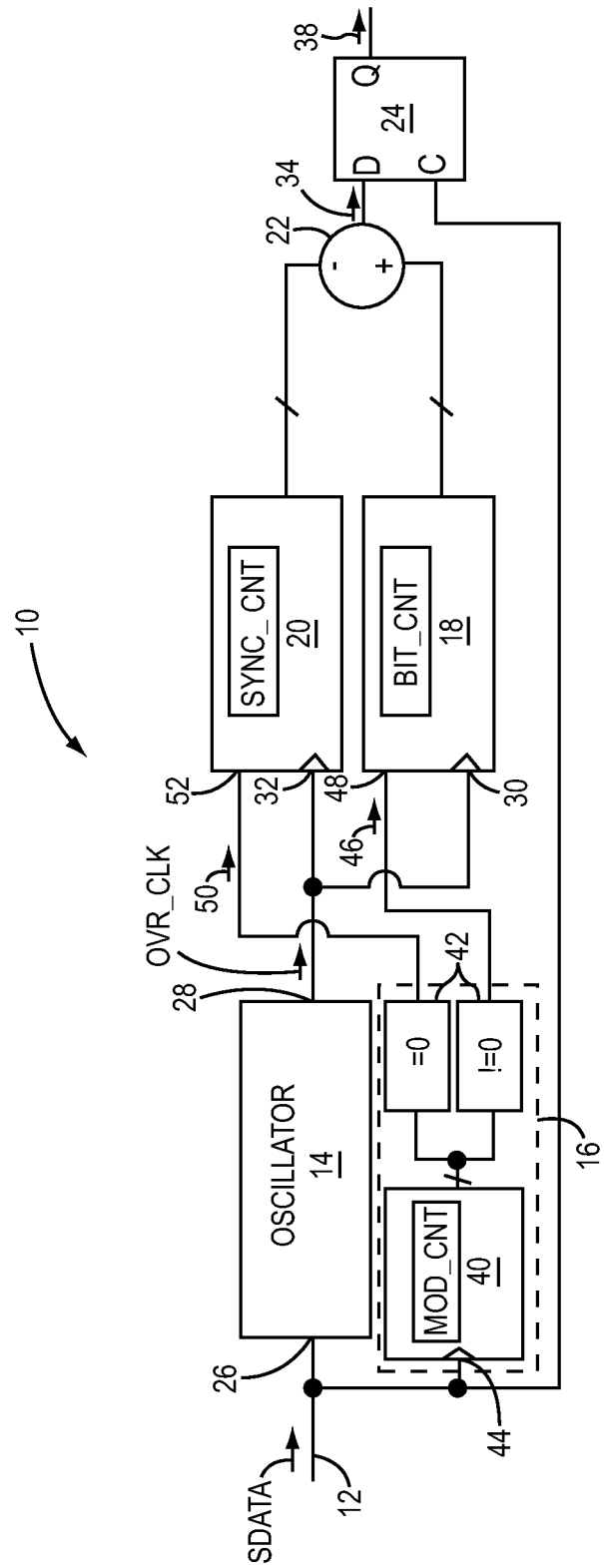
FIG. 1 illustrates one embodiment of a decoder, which may be provided in a bus controller of a bus interface system.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

With regard to the term "terminal," a terminal refers to any conductive feature in an electronic component for receiving signals, transmitting signals, and/or establishing a connection to another electronic component. For instance, a terminal may be one or more nodes, ports, conductive pads, pins, solder bumps, leads, pins, and/or the like.

When relative terminology, such as "approximately," "substantially," and the like are used in this disclosure, the relative terminology should be interpreted sensu lato but also in accordance to error tolerances dictated by performance parameters for a particular apparatus or method. These performance parameters may be described explicitly and/or implicitly by technical standard(s) relevant to an application that uses the particular apparatus or method to implement certain designed functions.

This disclosure relates generally to bus interface systems, components for bus interface systems and related methods of operating the same. Embodiments of a bus interface system may be a digital bus interface system and include various bus controllers connected by a bus line. For example, a bus interface system may include a master bus controller and a slave bus controller coupled by a bus line. Some embodiments of the bus interface system may be one wire bus interface systems where power, synchronization, payload information, and address information are all delivered to the slave bus controller on the bus line such that no other bus lines are provided between the master bus controller and the slave bus controller. More specifically, the master bus controller may be configured to generate an input data signal and transmit the input data signal on the bus line to the slave bus controller. The slave bus controller may include a decoder that extracts address information and payload information from the input data signal. As explained in further detail below, a bus protocol utilizing pulse width modulation (PWM) may be utilized where the decoder is clocked by the input data signal itself so that a separate clock signal does not have to be provided to the slave bus controller. Some embodiments of the slave bus controller may also include power conversion circuitry configured to convert the input data signal into a supply voltage. Accordingly, the slave bus controller may also be powered by the input data signal itself. In this manner, no other bus line has to be provided in the bus interface system in order to couple the master bus controller to the slave bus controller.

FIG. 1 illustrates one embodiment of a decoder 10, which may be provided in a bus controller of a bus interface system, such as a digital interface bus system. The decoder 10 is configured to receive an input data signal SDATA. The input data signal SDATA may be provided along a bus line 12 to the bus controller. The input data signal SDATA may define data pulses in order to represent data being transmitted along the bus line 12. For example, the input data signal SDATA may define data pulses such that logical values (e.g. bit values, logical symbols) are represented in accordance with a PWM bus protocol by the data pulses. More specifically, different logical values may be represented by a temporal duration of a data pulse during a time slot. As explained in further detail below, the PWM bus protocol also allows for the decoder 10 to be clocked by the input data signal SDATA itself, and thus an additional bus line does not have to be provided for a system clock signal in order to synchronize the decoder 10.

With regard to the input data signal SDATA, the data pulses defined by the input data signal SDATA are provided during time slots. More specifically, each of the data pulses may be provided during a different one of the time slots. The PWM bus protocol may organize the data pulses into data frames, where the data frame includes a certain number of the data pulses provided during a certain number of time slots. A temporal length of the time slots and thus of the data frame may be defined by the PWM bus protocol. For example, the PWM bus protocol may also allow for a bus address and a payload to be provided during certain time slots of the data frame. Also, an initial time slot of the data frame may be utilized to calibrate the decoder 10 as explained in further detail below. Accordingly, both the bus address and the payload can be provided by the input data signal SDATA so that additional address or data bus lines do not have to be provided. Furthermore, since the input data signal SDATA can also be used to calibrate the decoder 10, additional clock lines also do not have to be provided to synchronize the decoder 10. In this manner, a bus controller with the decoder 10, such as a slave bus controller, can extract both a bus address and a payload without requiring additional bus lines.

As shown in FIG. 1, the decoder includes an oscillator 14, counter enabling circuitry 16, a first counter 18, a second counter 20, a comparison circuit 22 and a sequential state element 24. The oscillator 14 is operable receive the input data signal SDATA from the bus line 12. As mentioned above, each of the data pulses may be provided during a different one of the time slots. In other words, the data pulses provided by the input data signal SDATA may correspond injectively with the time slots.

In this embodiment, the oscillator 14 includes an enabling terminal 26 and is coupled to the bus line 12 so that the input data signal SDATA is received at the enabling terminal 26. In this manner, the oscillator 14 is configured to be enabled by the data pulses of the input data signal SDATA. In other words, the oscillator 14 is triggered by an activating edge of each of the data pulses of the input data signal SDATA. The oscillator 14 is configured to generate oscillation pulses while enabled. The oscillator 14 shown in FIG. 1 is operable to provide an oscillation signal OVR_CLK from an output terminal 28 of the oscillator 14. While enabled, the oscillator 14 is configured to provide the oscillation signal OVR_CLK so that the oscillation signal OVR_CLK defines the oscillation pulses. The oscillator 14 is then deactivated in response to an end of the data pulse. More specifically, the oscillator 14 is deactivated and does not generate oscillation pulses in response to a deactivation edge of each of the data pulses of the input data signal SDATA. While deactivated, the oscillation signal OVR_CLK does not provide the oscillation pulses and thus does not provide the oscillation signal OVR_CLK. The oscillation signal OVR_CLK is held in a deactivation state while the oscillator 14 is not enabled and deactivated. Since the oscillator 14 is enabled by the data pulses of the input data signal SDATA and deactivated when the data pulses of the input data signal SDATA are not provided, the decoder 10 is more power efficient. For instance, little to no current may be drawn by the oscillator 14 when deactivated as a result of the input data signal SDATA being between the data pulses. When the oscillator 14 is deactivated, the oscillator 14 does not generate the oscillation pulses, and thus little to no power may be consumed by the oscillator 14 while deactivated.

In accordance with the PWM bus protocol, a pulse rate of the oscillation signal OVR_CLK is significantly greater than a pulse rate of the data pulses of the input data signal SDATA. For example, the oscillator 14 is configured to generate the oscillation pulses when enabled at a pulse rate that is at least three times greater than a pulse rate of the data pulses. Thus, for a particular data pulse provided during a particular time slot, a temporal duration (i.e., a pulse width) of the particular data pulse in the input data signal SDATA can be determined by the number of oscillation pulses provided in the oscillation signal OVR_CLK during the particular time slot. The PWM bus protocol assigns different temporal durations (i.e., different pulse widths) to different logical values. In this manner, the decoder 10 can count the number of oscillation pulses provided in the oscillation signal OVR_CLK during the particular time slot and thereby determine the logical value being represented by the particular data pulse during that particular time slot, as explained in further detail below. Note that how much greater the pulse rate of the oscillation signal OVR_CLK is with respect to the pulse rate of the input data signal SDATA may depend on various factors such as a cardinality of the set of logical values that can be represented by each of the data pulses and an acceptable error rate in discriminating between the different logical values. For example, it is easier to discriminate what logical value a data pulse represents if a set of logical values that can be represented by the data pulse only includes a bit value of "1" and a bit value "0." Thus, the pulse rate of the oscillation signal OVR_CLK can be lower if desired in this case. It is more difficult to discriminate what logical value a particular data pulse represents if the set of logical values includes logical symbols, such as "0," "1," "2." However, the greater the cardinality of the set of logical values that can be represented by the data pulse, the greater the informational efficiency of the PWM bus protocol.

As shown in FIG. 1, both the first counter 18 and the second counter 20 are configured to receive the oscillation signal OVR_CLK from the oscillator 14. More specifically, the first counter 18 includes an input terminal 30 coupled to the output terminal 28 of the oscillator 14 so that the first counter 18 receives the oscillation signal OVR_CLK at the input terminal 30. The second counter 20 includes an input terminal 32 coupled to the output terminal 28 of the oscillator 14 so that the second counter 20 receives the oscillation signal OVR_CLK at the input terminal 32. The first counter 18 and the second counter 20 are each enabled and disabled by the counter enabling circuitry 16.

The first counter 18 is operable to store a first count parameter BIT_CNT. While the first counter 18 is enabled by the counter enabling circuitry 16, the first counter 18 is configured to increment the first count parameter BIT_CNT in response to each of the oscillation pulses provided by the oscillation signal OVR_CLK. When the first counter 18 is disabled by the counter enabling circuitry, the first counter 18 holds the first count parameter BIT_CNT at its current value. The second counter 20 is operable to store the reference parameter SYNC_CNT. While the second counter 20 is enabled by the counter enabling circuitry 16, the second counter 20 is configured to increment the reference parameter SYNC_CNT in response to each of the oscillation pulses provided by the oscillation signal OVR_CLK. When the second counter 20 is disabled by the counter enabling circuitry 16, the second counter 20 holds the reference parameter SYNC_CNT at its current value.

The input data signal SDATA may be formatted in accordance with the PWM bus protocol so that the data pulses defined by the input data signal SDATA during the time slots are organized into data frames. For each data frame, an initial time slot may be a calibration time slot. The data pulse provided during the calibration time slot is a calibration pulse, which may be provided by a bus controller (e.g., a master bus controller as explained in further detail below) with a precise pulse duration. For example, a duty cycle of the calibration pulse may be approximately 50% with respect to the calibration time slot and thus be provided during half of the calibration time slot. The oscillator 14 is configured to be enabled by the calibration data pulse. As explained in further detail below, the counter enabling circuitry 16 is configured to disable the first counter 18 and enable the second counter 20 during the calibration time slot of the data frame. Also, the second counter 20 may have reset the reference parameter SYNC_CNT to an initial value (e.g., such as zero) prior to an activation edge of the calibration pulse. Thus, during the calibration time slot of each of the data frames, the second counter 20 is configured to count the oscillation pulses defined by the oscillation signal OVR_CLK. In this manner, the reference parameter SYNC_CNT indicates a reference number, and the reference number is based on how many of the oscillation pulses were generated by the oscillator 14 during the calibration time slot as a result of the calibration pulse. In this example, the reference number is equal to how many of the oscillation pulses were generated by the oscillator 14 during the calibration time slot. This reference number is used to determine logical values of a remainder of the data pulses provided in the data frame. By making the decoder 10 responsive to the calibration pulse as described above, the decoder 10 can be synchronized and calibrated by the input data signal SDATA itself without having to receive an external clock signal on another bus line. It should be noted that in other embodiments, the calibration time slot may be greater than the other time slots in the data frame. Thus, in these cases, the reference number may be equal to some fraction of the number of oscillation pulses that were generated by the oscillator during the calibration time slot. In this case, the second counter 20 may be configured to be incremented after a certain number of the oscillation pulses or may include division circuitry that divides the reference parameter SYNC_CNT by the appropriate integer after the calibration pulse so that the reference parameter SYNC_CNT is stored after the calibration time pulse to equal the appropriate fraction of the number of oscillation pulses that were generated by the oscillator during the calibration time slot.

In accordance with the PWM bus protocol, the remainder of the data pulses provided in the other time slots of the data frame may represent a bus address, a payload, and/or the like. To recover the logical value represented by a data pulse during a time slot, the first counter 18 is configured to count the oscillation pulses such that the first count parameter BIT_CNT indicates a number of the oscillation pulses generated during the time slot. More specifically, after the calibration time slot, the counter enabling circuitry 16 is configured to disable the second counter 20 and enable the first counter 18 in response to the data pulse defined by the input data signal SDATA during the time slot. Thus, for the remainder of the time slots in the data frame, the second counter 20 holds the reference parameter SYNC_CNT indicating the reference number, which is how many of the oscillation pulses were generated by the oscillator during the calibration time slot as a result of the calibration pulse.

The first counter 18 is configured to reset the first count parameter BIT_CNT to an initial value (e.g., zero) in response to the activation edge of the data pulse. In response to the data pulse defined by the input data signal SDATA during the time slot, the oscillator 14 is configured to be enabled by the data pulse of the input data signal SDATA and generate oscillation pulses while enabled. The first counter 18 (which has been enabled by the counter enabling circuitry 16) is configured to increment the first count parameter BIT_CNT in response to the oscillation pulses from the oscillator 14. Thus, for each of the data pulses provided after the calibration time slot, the first counter 18 is configured to count the oscillation pulses defined by the oscillation signal OVR_CLK such that the first count parameter BIT_CNT indicates a number of the oscillation pulses generated during the time slot. The oscillation pulses defined by the oscillation signal OVR_CLK were generated as a result of the data pulse of the input data signal SDATA. In this manner, the first count parameter BIT_CNT indicates how many of the oscillation pulses were generated during the time slot during the data pulse of the input data signal SDATA.

To determine the logical value of the data pulse from the first count parameter BIT_CNT, the comparison circuit 22 is configured to compare the first count parameter BIT_CNT with the reference parameter SYNC_CNT. As explained above, the reference parameter SYNC_CNT indicates the reference number, which is a count of the oscillation pulses that were generated by the oscillator 14 during the calibration time slot as a result of the calibration pulse at the beginning of the data frame. The PWM bus protocol may define a set of logical values that may be represented by each of the data pulses provided during the time slots of the data frame after the calibration time slot. The comparison circuit 22 is configured to generate a data output 34 such that the data output 34 represents a first logical value in response to the first count parameter BIT_CNT being greater than the reference parameter SYNC_CNT and such that the data output 34 represents a second logical value in response to the first count parameter BIT_CNT being less than the reference parameter SYNC_CNT.

For a bit scheme, the set of logical values may be the set of bit values [0, 1]. In the embodiment shown in FIG. 1, the comparison circuit 22 is configured to the data output 34 as a data output signal such that the data output signal represents an output bit. The output bit is a first bit value (e.g., bit value of 1 in the set of bit values [0, 1]) if the first count parameter BIT_CNT is greater than the reference parameter SYNC_CNT. For example, in this case, the data pulse defined during the time slot by the data pulse of the input data signal SDATA had a temporal duration that was longer than a temporal duration of the calibration pulse defined by the data pulse of the input data signal SDATA during the calibration time slot. As a result, the number of oscillation pulses provided by the oscillation signal OVR_CLK during this time slot is greater than the number of oscillation pulses provided during the calibration time slot. Thus, the comparison circuit 22 will determine that the first count parameter BIT_CNT is greater than the reference parameter SYNC_CNT and generate the data output 34 such that the data output 34 represents the first bit value (e.g., the bit value 1).

The output bit is a second bit value (e.g., bit value of 0 in the set of bit values [0, 1]) if the first count parameter BIT_CNT is less than the reference parameter SYNC_CNT. In this case, the data pulse defined during the time slot by the data pulse of the input data signal SDATA had a temporal duration that was shorter than a temporal duration of the calibration pulse defined by the data pulse of the input data signal SDATA during the calibration time slot. As a result, the number of oscillation pulses provided by the oscillation signal OVR_CLK during this time slot is less than the number of oscillation pulses provided during the calibration time slot. Thus, the comparison circuit 22 will determine that the first count parameter BIT_CNT is less than the reference parameter SYNC_CNT and generate the data output 34 such that the data output 34 represents the second bit value (e.g., the bit value 0).

The sequential state element 24 is configured to receive the data output 34 and store the output bit represented by the data output 34, which in this example is provided by a data output signal. In this example, the sequential state element 24 is a flip-flop that has a data input terminal D, a clock terminal C, and a data output terminal Q. The data output 34 (e.g., the data output signal) is received by the sequential state element 24 at the data input terminal D. The input data signal SDATA is received at the clock terminal C and thus is used to clock the sequential state element 24. A memory input signal 38 is generated at the data output terminal Q so that the bit value stored by the sequential state element 24 is provided to memory outside of the decoder 10. As explained below, in other embodiments, the set of logical values that can be represented by the data pulses may be logical symbols. In this case, the data output 34 may have multiple data output signals in order to represent multiple bits. Thus, additional sequential state elements (not explicitly shown) may be provided to store the various bits.

As shown in FIG. 1, the comparison circuit 22 is provided as a subtractor that is configured to compare the first count parameter BIT_CNT with the reference parameter SYNC_CNT by subtracting the first count parameter BIT_CNT and the reference parameter SYNC_CNT. In this embodiment, the comparison circuit 22 is configured to subtract the first count parameter BIT_CNT from the reference parameter SYNC_CNT to determine a difference between the first count parameter BIT_CNT and the reference parameter SYNC_CNT. If the difference is positive, the comparison circuit 22 circuit generates the data output 34 to represent the first bit value (e.g., the bit value 1). If the difference is negative, the comparison circuit 22 circuit generates the data output 34 to represent the second bit value (e.g., the bit value 0).

As mentioned above, the counter enabling circuitry 16 is configured to enable the second counter 20 and disable the first counter 18 during a calibration time slot of the data frame and enable the first counter 18 and disable the second counter 20 during time slots of the data frame after the calibration time slot. To do this, the counter enabling circuitry 16 shown in FIG. 1 includes a modulo counter 40 and a logical network 42. The modulo counter 40 is operable to store a modulo counter parameter MOD_CNT and receive the input data signal SDATA at an input terminal 44. The modulo counter 40 is configured to increment the modulo counter parameter MOD_CNT in response to each of the data pulses defined by input data signal SDATA, including the calibration pulse and the other data pulses defined during the time slots of a data frame.

Since the modulo counter 40 is modulo, the modulo counter parameter MOD_CNT wraps around to cycle through an initial value to a final value and back to the initial value to cycle through the values again. The cycle can be set in accordance with the number of time slots provided in each data frame. For example, if the number of time slots in each data frame is an integer N and the initial value is zero (0), then the modulo counter 40 can be configured to cycle the modulo counter parameter MOD_CNT between the initial value of zero (0) and the final value of N−1. Accordingly, the initial value (e.g., zero (0)) can be used to indicate the initial time slot of a data frame, which in this embodiment is the calibration time slot that has the calibration pulse. Any other one of the values in the cycle is for time slots after the calibration time slot. The final value of N−1 indicates that the last time slot in the data frame has been reached. If the modulo counter parameter MOD_CNT is incremented again after reaching the final value of N−1, the modulo counter parameter MOD_CNT wraps back around to the initial value of zero (0) and thereby indicates the calibration time slot for the next data frame. The initial value of zero (0) is thus a calibration number that indicates the calibration time slot of the data frame. In this manner, the counter enabling circuitry 16 allows the decoder 10 to be synchronized with the various data frames provided with the input data signal SDATA.

The logical network 42 is configured to disable the first counter 18 and enable the second counter 20 such that the second counter 20 counts the oscillation pulses if the modulo counter parameter MOD_CNT is equal to a calibration number (e.g. zero (0)). In this example, the logical network 42 is configured to generate an enabling signal 46 received at an enabling terminal 48 of the first counter 18 and generate an enabling signal 50 receive at an enabling terminal 52 of the second counter 20. The logical network 42 generates the enabling signal 46 in a deactivation state, and the enabling signal 46 in an activation state if the modulo counter parameter MOD_CNT is equal to a calibration number (e.g. zero (0)). As such, the first counter 18 is disabled and the second counter is enabled during the calibration time slot. However, the logical network 42 is configured to enable the first counter 18 and disable the second counter 20 such that the first counter 18 counts the oscillation pulses if the modulo counter parameter MOD_CNT is not equal to the calibration number. Thus, the logical network 42 shown in FIG. 1 generates the enabling signal 46 in the activation state and the enabling signal 50 in the deactivation state when the modulo counter parameter MOD_CNT is equal to any value from 1 to N−1. As such, the first counter 18 is enabled and the second counter is disabled during the time slots that are provided after the calibration time slot.

Figure 2:
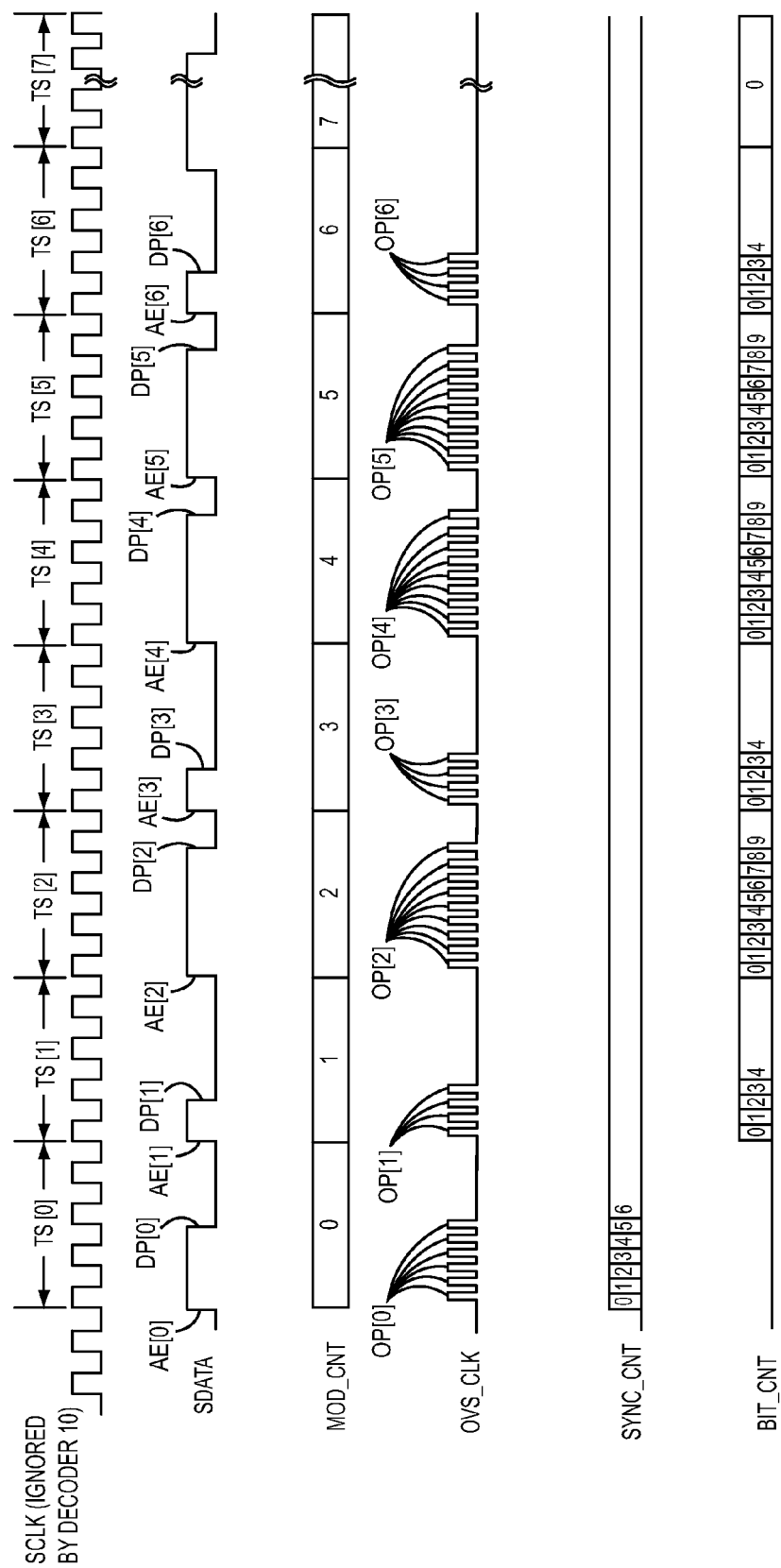
FIG. 2 illustrates a timing diagram for the decoder shown in FIG. 1 during an exemplary data frame provided in accordance to a one wire PWM bus protocol.

Referring now to FIG. 1 and FIG. 2, FIG. 2 illustrates a timing diagram for the decoder 10 shown in FIG. 1 during an exemplary data frame provided in accordance to a one wire PWM bus protocol. As shown in FIG. 2, the data frame in this example has eight time slots (referred to generally and generically as elements TS and specifically as elements TS[0]-TS[7]). The timing diagram shown in FIG. 2 illustrates signal levels and parameter values for embodiments of a system clock signal SCLK, the input data signal SDATA, the modulo counter parameter MOD_CNT, the oscillator signal OVS_CLK, the reference parameter SYNC_CNT, and the first counter parameter BIT_CNT as a function of time during the time slots of the data frame. The system clock signal SCLK is ignored by the decoder 10 and is not provided at all to the decoder 10 shown in FIG. 1. However, the system clock signal SCLK may be utilized by outside circuitry (such as a master bus controller) to generate the input data signal SDATA, as explained in further detail below. The system clock signal SCLK is being shown here to help clarify the timing diagram with respect to system timing despite the decoder 10 not utilizing the system clock signal SCLK. As shown in FIG. 2, a time duration of each of the time slots TS is approximately equal to four clock cycles.

The input data signal SDATA provided to the decoder 10 defines data pulses (referred to generally or generically as elements DP and specifically as elements DP[0] to DP[6]) during each of the time slots TS[1]-TS[6]. More specifically, a data pulse DP[0] is defined by the input data signal SDATA during a time slot TS[0]. This is the initial time slot, which is a calibration time slot. Thus, the data pulse DP[0] is a calibration data pulse. A duty cycle of the data pulse DP[0] is 50%, and thus the data pulse DP[0] is provided for half the time slot TS[0] and has a temporal duration equal to two clock cycles of the system clock signal SCLK. The PWM bus protocol in this example uses one of the time slots to communicate a one-bit command. A data pulse DP[1] is defined by the input data signal SDATA during a time slot TS[1]. The time slot TS[1] is a command time slot and the data pulse DP[1] represents a command bit. A duty cycle of the data pulse DP[1] is 25%, and thus the data pulse DP[1] is provided for one quarter of the time slot TS[1] and has a temporal duration equal to one clock cycle of the system clock signal SCLK.

The PWM bus protocol in this example uses two of the time slots to communicate a two-bit bus address. A data pulse DP[2] is defined by the input data signal SDATA during a time slot TS[2]. The time slot TS[2] is a bus address time slot, and the data pulse DP[2] represents an address bit for a bus address. A duty cycle of the data pulse DP[2] is 75%, and thus the data pulse DP[2] is provided for 3 quarters of the time slot TS[2] and has a temporal duration equal to three clock cycles of the system clock signal SCLK. A data pulse DP[3] is defined by the input data signal SDATA during a time slot TS[3]. The time slot TS[3] is also an address time slot, and the data pulse DP[3] represents another address bit for the bus address. A duty cycle of the data pulse DP[3] is 25% and thus the data pulse DP[3] is provided for one quarter of the time slot TS[3] and has a temporal duration equal to one clock cycle of the system clock signal SCLK.

The PWM bus protocol in this example uses three of the time slots TS to communicate a three-bit payload. A data pulse DP[4] is defined by the input data signal SDATA during a time slot TS[4]. The time slot TS[4] is a payload time slot, and the data pulse DP[4] represents a first data bit for the three-bit data payload. A duty cycle of the data pulse DP[4] is 75%, and thus the data pulse DP[4] is provided for 3 quarters of the time slot TS[4] and has a temporal duration equal to three clock cycles of the system clock signal SCLK. A data pulse DP[5] is defined by the input data signal SDATA during a time slot TS[5]. The time slot TS[5] is another payload time slot, and the data pulse DP[5] represents a second data bit for the three-bit data payload. A duty cycle of the data pulse DP[5] is 75%, and thus the data pulse DP[4] is provided for 3 quarters of the time slot TS[5] and has a temporal duration equal to three clock cycles of the system clock signal SCLK. A data pulse DP[6] is defined by the input data signal SDATA during a time slot TS[6]. The time slot TS[6] is yet another payload time slot, and the data pulse DP[5] represents a third data bit for the three-bit data payload. A duty cycle of the data pulse DP[6] is 25%, and thus the data pulse DP[6] is provided for a quarter of the time slot TS[6] and has a temporal duration equal to one clock cycle of the system clock signal SCLK. A time slot TS[7] is a set up time slot for the next data frame. During the time slot TS[7], the input data signal SDATA is held high. The time slot TS[7] may extend for any period of time, and thus may be longer than the time slots TS[1]-TS[6].

As shown in FIG. 2, the modulo counter parameter MOD_CNT is provided to equal the calibration number of zero (0) during the time slot TS[0], which is the calibration time slot. The counter enabling circuitry 16 is thus configured to enable the second counter 20 and disable the first counter 18. The oscillator 14 is configured to be enabled by the data pulse DP[0], which is the calibration pulse provided during the calibration time slot (i.e., TS[0]). The reference parameter SYNC_CNT of the second counter 20 may have been reset to an initial value of zero (0) prior to an activation edge AE[0] of the data pulse DP[0]. The second counter 20 is configured to count the oscillation pulses OP[0] defined by the oscillation signal OVR_CLK during the time slot TS[0] as a result of the data pulse DP[0] (the calibration pulse). More specifically, the second counter 20 is configured to increment the reference parameter SYNC_CNT as a result of each of the oscillation pulses OP[0] defined by the oscillation signal OVR_CLK during the time slot TS[0]. In this example, the reference parameter SYNC_CNT is set equal to a reference number of six (6) as a result of the six oscillation pulses OP[0] generated as a result of the data pulse DP[0] during the time slot TS[0]. As a result of the end of the data pulse DP[0], no more of the oscillation pulses OP[0] are generated, and the oscillation signal OVS_CLK is held in a deactive state for a remainder of the time slot TS[0]. Accordingly, the reference parameter SYNC_CNT indicates the reference number of six (6), which is how many of the oscillation pulses OP[0] were generated by the oscillator 14 during the time slot TS[0] (i.e., the calibration time slot) as a result of the data pulse DP[0] (i.e., the calibration pulse).

The modulo counter parameter MOD_CNT is provided to equal the number of one (1) during the time slot TS[1], which is the command time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[1], which is the command time slot. The first counter 18 may be configured to reset the first count parameter BIT_CNT to an initial value of zero (0) in response to an activation edge AE[1] of the data pulse DP[1]. The first counter 18 is configured to count the oscillation pulses OP[1] defined by the oscillation signal OVR_CLK during the time slot TS[1] as a result of the data pulse DP[1] (the command pulse), which had a 25% duty cycle.

More specifically, the first counter 18 is configured to increment the first count parameter BIT_CNT as a result of each of the oscillation pulses OP[1] defined by the oscillation signal OVR_CLK during the time slot TS[1]. In this example, the first count parameter BIT_CNT is set equal to a number of four (4) as a result of the four oscillation pulses OP[1] generated as a result of the data pulse DP[1] during the time slot TS[1]. As a result of the end of the data pulse DP[1], no more of the oscillation pulses OP[1] are generated and the oscillation signal OVS_CLK is held in a deactive state for a remainder of the time slot TS[1]. Accordingly, the first count parameter BIT_CNT indicates a number of four (4), which is how many of the oscillation pulses OP[1] were generated by the oscillator 14 during the time slot TS[1] (i.e., the command time slot) as a result of the data pulse DP[1] (i.e., a command pulse). The comparison circuit 22 then subtracts the reference parameter SYNC_CNT from the first count parameter BIT_CNT. Since four (4) minus six (6) is negative, the comparison circuit 22 generates the data output 34 so that the data output 34 represents a bit value of 0. The command bit has thus been recovered in this case to equal the bit value of 0, which may indicate a write command. If the command bit had been a bit value of 1, this may have indicated a read command.

The modulo counter parameter MOD_CNT is provided to equal the number of two (2) during the time slot TS[2], which is a first address time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[2], which is a first address time slot. The first counter 18 may be configured to reset the first count parameter BIT_CNT to an initial value of zero (0) in response to an activation edge AE[2] of the data pulse DP[2]. The first counter 18 is configured to count the oscillation pulses OP[2] defined by the oscillation signal OVR_CLK during the time slot TS[2] as a result of the data pulse DP[2] (i.e., a first address pulse), which has a 75% duty cycle.

More specifically, the first counter 18 is configured to increment the first count parameter BIT_CNT as a result of each of the oscillation pulses OP[2] defined by the oscillation signal OVR_CLK during the time slot TS[2]. In this example, the first count parameter BIT_CNT is set equal to a number of nine (9) as a result of the nine oscillation pulses OP[2] generated as a result of the data pulse DP[2] during the time slot TS[2]. As a result of the end of the data pulse DP[2], no more of the oscillation pulses OP[2] are generated, and the oscillation signal OVS_CLK is held in a deactive state for a remainder of the time slot TS[2]. Accordingly, the first count parameter BIT_CNT indicates a number of nine (9), which is how many of the oscillation pulses OP[2] were generated by the oscillator 14 during the time slot TS[2] (i.e., the first address time slot) as a result of the data pulse DP[2] (i.e., the first address pulse). The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a bit value of 1. The first address bit has thus been recovered in this case to equal a bit value of 1.

The modulo counter parameter MOD_CNT is provided to equal the number of three (3) during the time slot TS[3], which is a second address time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[3], which is a second address time slot. The first counter 18 may be configured to reset the first count parameter BIT_CNT to an initial value of zero (0) in response to an activation edge AE[3] of the data pulse DP[3]. The first counter 18 is configured to count the oscillation pulses OP[3] defined by the oscillation signal OVR_CLK during the time slot TS[3] as a result of the data pulse DP[3] (i.e., a second address pulse), which has a 25% duty cycle.

More specifically, the first counter 18 is configured to increment the first count parameter BIT_CNT as a result of each of the oscillation pulses OP[3] defined by the oscillation signal OVR_CLK during the time slot TS[3]. In this example, the first count parameter BIT_CNT is set equal to a number of four (4) as a result of the four oscillation pulses OP[3] generated as a result of the data pulse DP[3] during the time slot TS[3]. As a result of the end of the data pulse DP[3], no more of the oscillation pulses OP[3] are generated, and the oscillation signal OVS_CLK is held in a deactive state for a remainder of the time slot TS[3]. Accordingly, the first count parameter BIT_CNT indicates a number of four (4), which is how many of the oscillation pulses OP[3] were generated by the oscillator 14 during the time slot TS[3] (i.e., the second address time slot) as a result of the data pulse DP[3] (i.e., the second address pulse). The comparison circuit 22 then subtracts the reference parameter SYNC_CNT from the first count parameter BIT_CNT. Since four (4) minus six (6) is negative, the comparison circuit 22 generates the data output 34 so that the data output 34 represents a bit value of 0. The second address bit has thus been recovered in this case to equal a bit value of 0.

The modulo counter parameter MOD_CNT is provided to equal a number of four (4) during the time slot TS[4], which is a first payload time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[4], which is the first payload time slot. The first counter 18 may be configured to reset the first count parameter BIT_CNT to an initial value of zero (0) in response to an activation edge AE[4] of the data pulse DP[4]. The first counter 18 is configured to count the oscillation pulses OP[4] defined by the oscillation signal OVR_CLK during the time slot TS[4] as a result of the data pulse DP[4] (i.e., a first payload pulse), which has a 75% duty cycle.

More specifically, the first counter 18 is configured to increment the first count parameter BIT_CNT as a result of each of the oscillation pulses OP[4] defined by the oscillation signal OVR_CLK during the time slot TS[4]. In this example, the first count parameter BIT_CNT is set equal to a number of nine (9) as a result of the nine oscillation pulses OP[4] generated as a result of the data pulse DP[4] during the time slot TS[4]. As a result of the end of the data pulse DP[4], no more of the oscillation pulses OP[4] are generated, and the oscillation signal OVS_CLK is held in a deactive state for a remainder of the time slot TS[4]. Accordingly, the first count parameter BIT_CNT indicates a number of nine (9), which is how many of the oscillation pulses OP[4] were generated by the oscillator 14 during the time slot TS[4] (i.e., the first payload time slot) as a result of the data pulse DP[4] (i.e., the first payload pulse). The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a bit value of 1. The first payload bit has thus been recovered in this case to equal a bit value of 1.

The modulo counter parameter MOD_CNT is provided to equal the number of five (5) during the time slot TS[5], which is a second payload time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[5], which is the second payload time slot. The first counter 18 may be configured to reset the first count parameter BIT_CNT to an initial value of zero (0) in response to an activation edge AE[5] of the data pulse DP[5]. The first counter 18 is configured to count the oscillation pulses OP[5] defined by the oscillation signal OVR_CLK during the time slot TS[5] as a result of the data pulse DP[5] (i.e., a second payload pulse), which has a 75% duty cycle.

More specifically, the first counter 18 is configured to increment the first count parameter BIT_CNT as a result of each of the oscillation pulses OP[5] defined by the oscillation signal OVR_CLK during the time slot TS[5]. In this example, the first count parameter BIT_CNT is set equal to a number of nine (9) as a result of the nine oscillation pulses OP[5] generated as a result of the data pulse DP[5] during the time slot TS[5]. As a result of the end of the data pulse DP[5], no more of the oscillation pulses OP[5] are generated, and the oscillation signal OVS_CLK is held in a deactive state for a remainder of the time slot TS[5]. Accordingly, the first count parameter BIT_CNT indicates a number of nine (9), which is how many of the oscillation pulses OP[5] were generated by the oscillator 14 during the time slot TS[5] (i.e., the second payload time slot) as a result of the data pulse DP[5] (i.e., the second payload pulse). The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a bit value of 1. The second payload bit has thus been recovered in this case to equal a bit value of 1.

Also, the modulo counter parameter MOD_CNT is provided to equal a number of six (6) during the time slot TS[6], which is a third payload time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[6], which is the third payload time slot. The first counter 18 may be configured to reset the first count parameter BIT_CNT to an initial value of zero (0) in response to an activation edge AE[6] of the data pulse DP[6]. The first counter 18 is configured to count the oscillation pulses OP[6] defined by the oscillation signal OVR_CLK during the time slot TS[6] as a result of the data pulse DP[6] (i.e., a third payload pulse), which has a 25% duty cycle.

More specifically, the first counter 18 is configured to increment the first count parameter BIT_CNT as a result of each of the oscillation pulses OP[6] defined by the oscillation signal OVR_CLK during the time slot TS[6]. In this example, the first count parameter BIT_CNT is set equal to a number of four (4) as a result of the four oscillation pulses OP[6] generated as a result of the data pulse DP[6] during the time slot TS[6]. As a result of the end of the data pulse DP[6], no more of the oscillation pulses OP[6] are generated, and the oscillation signal OVS_CLK is held in a deactive state for a remainder of the time slot TS[6]. Accordingly, the first count parameter BIT_CNT indicates a number of four (4), which is how many of the oscillation pulses OP[6] were generated by the oscillator 14 during the time slot TS[6] (i.e., the third payload time slot) as a result of the data pulse DP[6] (i.e., the third payload pulse). The comparison circuit 22 then subtracts the reference parameter SYNC_CNT from the first count parameter BIT_CNT. Since four (4) minus six (6) is negative, the comparison circuit 22 generates the data output 34 so that the data output 34 represents a bit value of 0. The third payload bit has thus been recovered in this case to equal a bit value of 0. Note that in this embodiment, the data pulses DP and oscillation pulses (referred to generally or generically as elements OP) are positive pulses. Other embodiments of the decoder 10 may be provided to operate with the data pulses DP and/or the oscillation pulses OP being negative pulses. For example, in another embodiment, the data pulses DP are negative pulses, while the oscillation pulses OP are positive pulses.

Finally, the modulo counter parameter MOD_CNT is provided to equal the number of seven (7) during the time slot TS[7], which is the setup time slot. The time slot TS[7] does not include a data pulse. Rather, the input data signal SDATA is held in the activation state during the entire time slot TS[7]. The counter enabling circuitry 16 is configured to deactivate the oscillator 14 so that the oscillator does not generate the oscillation pulses OP when the modulo counter parameter MOD_CNT is equal to 7 during the time slot TS[7]. Thus, oscillation pulses OP are not generated during the time slot TS[7]. The first counter 18 may be configured to reset the first count parameter BIT_CNT to an initial value of zero (0) in response to an activation edge AE[7] of input data signal SDATA during the time slot TS[7]. Similarly, the second counter 20 may be configured to reset the reference parameter SYNC_CNT to an initial value of zero (0) in response to an activation edge AE[7] of input data signal SDATA during the time slot TS[7]. In this manner, the decoder 10 is set up for the next data frame. The time slot TS[7] could extend for any period of time until the next data frame is ready to be communicated.

In the example described above in FIG. 2, the time slot D[0] has the same temporal duration as the time slots D[1]-D[6]. However, in other embodiments, the time slot D[0] (i.e., the calibration time slot) may be greater than the temporal duration of the time slots D[1]-D[6]. For example, the time slot D[0] may be four times as long as the temporal duration of the time slots D[1]-D[6]. Thus, in this case, the reference number may be equal to a quarter of the number of oscillation pulses OP[0] that were generated by the oscillator 14 during the calibration time slot. The second counter 20 may be configured to divide the reference parameter SYNC_CNT by four to equal the reference number of a quarter of the number of the oscillation pulses OP[0] that were generated by the oscillator 14 during the time slot D[0] (i.e., the calibration time slot).

Figure 3:
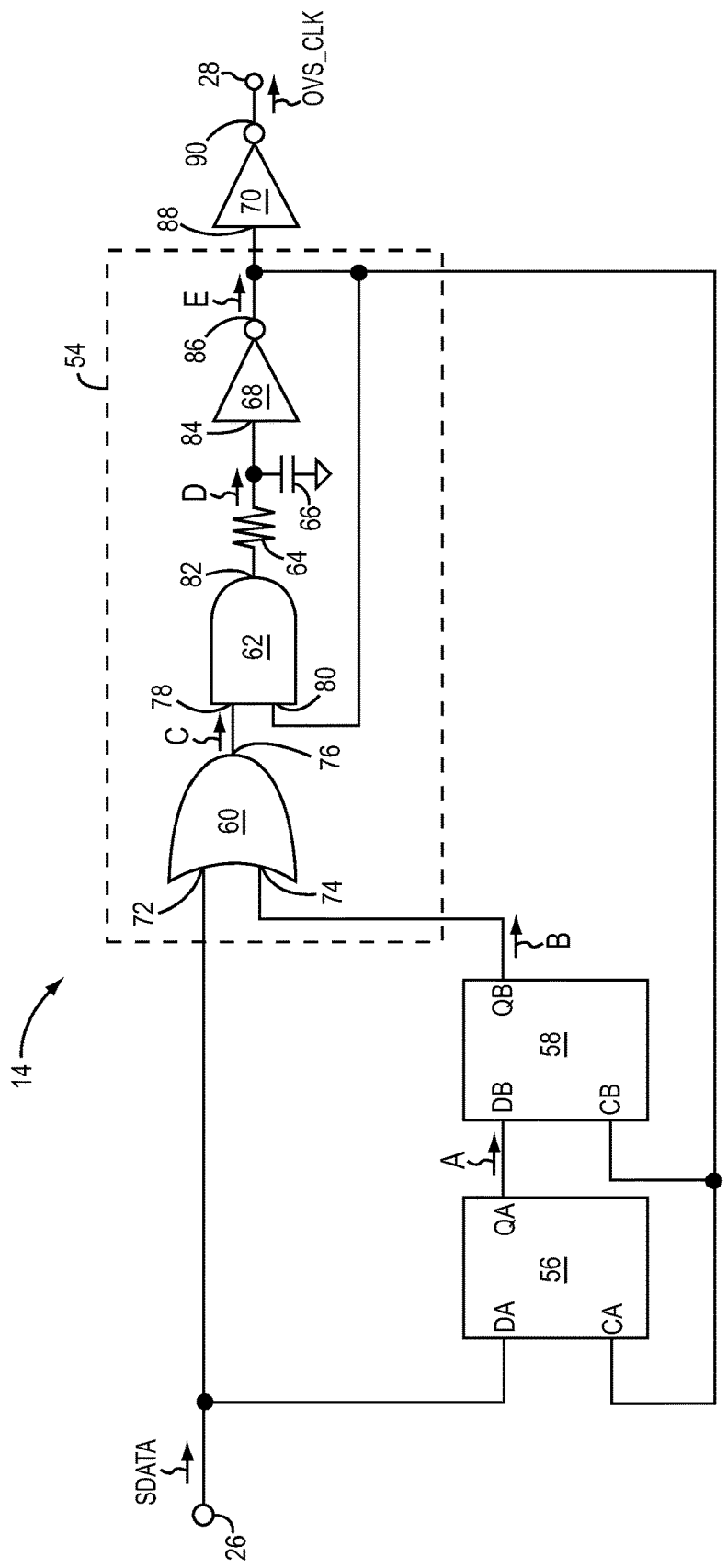
FIG. 3 illustrates one embodiment of an oscillator provided within the decoder shown in FIG. 1.

FIG. 3 illustrates one embodiment of the oscillator 14 provided within the decoder 10 shown in FIG. 1. The oscillator 14 includes a ring oscillator 54, a flip-flop 56, and a flip-flop 58. The ring oscillator 54 includes an OR gate 60, an AND gate 62, a resistor 64, a capacitor 66, and an inverter gate 68. An inverter gate 70 is connected to the inverter gate 68 of the ring oscillator 54. The input data signal SDATA is received at the enabling terminal 26. The oscillator 14 provides an asynchronous turn on and a synchronous turn off. An asynchronous turn on is acceptable because the normal state of this oscillator 14 is off. A synchronous turn off is used because data pulse edges on SDATA do not have a guaranteed phase.

The flip-flops 56, 58 are coupled sequentially with one another such that the flip-flops 56, 58 are configured to receive the input data signal SDATA and generate a delayed data signal B. More specifically, the flip-flop 56 includes a data terminal DA coupled to receive the data input signal SDATA, an output terminal QA, and a clock terminal CA. The flip-flop 58 includes a data terminal DB coupled to the output terminal QA, an output terminal QB, and a clock terminal CB. Flip-flop 56 generates a delayed data signal A from the data input signal SDATA, which is received by the flip-flop 58 at the data terminal DB. In response, the flip-flop 58 generates the delayed data signal B from the output terminal QB. In other embodiments, more flip-flops are provided in sequence with the flip-flops 56, 58 to provide an appropriate delay. The clock terminals CA, CB of the flip-flops 56, 58 are coupled to the ring oscillator 54 such that each of the flip-flops 56, 58 is clocked by the ring oscillator 54.

The OR gate 60 has an input terminal 72 coupled to receive the input data signal SDATA, an input terminal 74 coupled to the output terminal QB of the flip-flop 58, and an output terminal 76. The flip-flops 56, 58 are thus coupled to provide the delayed data signal B to the input terminal 74 of the OR gate 60. The OR gate 60 performs an OR operation on the input data signal SDATA and the delayed data signal B to generate an oscillator enable signal C at the output terminal 76.

The AND gate 62 has an input terminal 78 coupled to the output terminal 76 so as to receive the oscillator enable signal C, an input terminal 80 coupled to the ring oscillator 54, and an output terminal 82. The AND gate 62 thus gates the ring oscillator 54 and provides a feedback oscillator signal D from the output terminal 82. The resistor 64 and the capacitor 66 are used to provide a time constant for the ring oscillator 54. The feedback oscillator signal D is generated in accordance with the time constant set by the resistor 64 and capacitor 66 respectively. The inverter gate 68 has an input terminal 84 that receives the feedback oscillator signal D. The inverter gate 68 is an initial stage of the ring oscillator 54. The inverter gate 68 is configured to invert the feedback oscillator signal D and generate an intermediate oscillator signal E from an output terminal 86. The intermediate oscillator signal E is fed back to the input terminal 80 of the AND gate 62 and is provided to the clock terminals CA, CB to clock the flip-flops 56, 58. The AND gate 62 thus perform an AND operation on the intermediate oscillator signal E and the oscillator enable signal C to generate the feedback oscillator signal D. The intermediate oscillator signal E is provided to an input terminal 88 of the inverter gate 70. The inverter gate 70 is a buffer of the ring oscillator 54. The inverter gate 70 is configured to generate the oscillator signal OVS_CLK from an output terminal 90 of the inverter gate 70. The oscillator signal OVS_CLK is then output from the output terminal 28.

Figure 4:
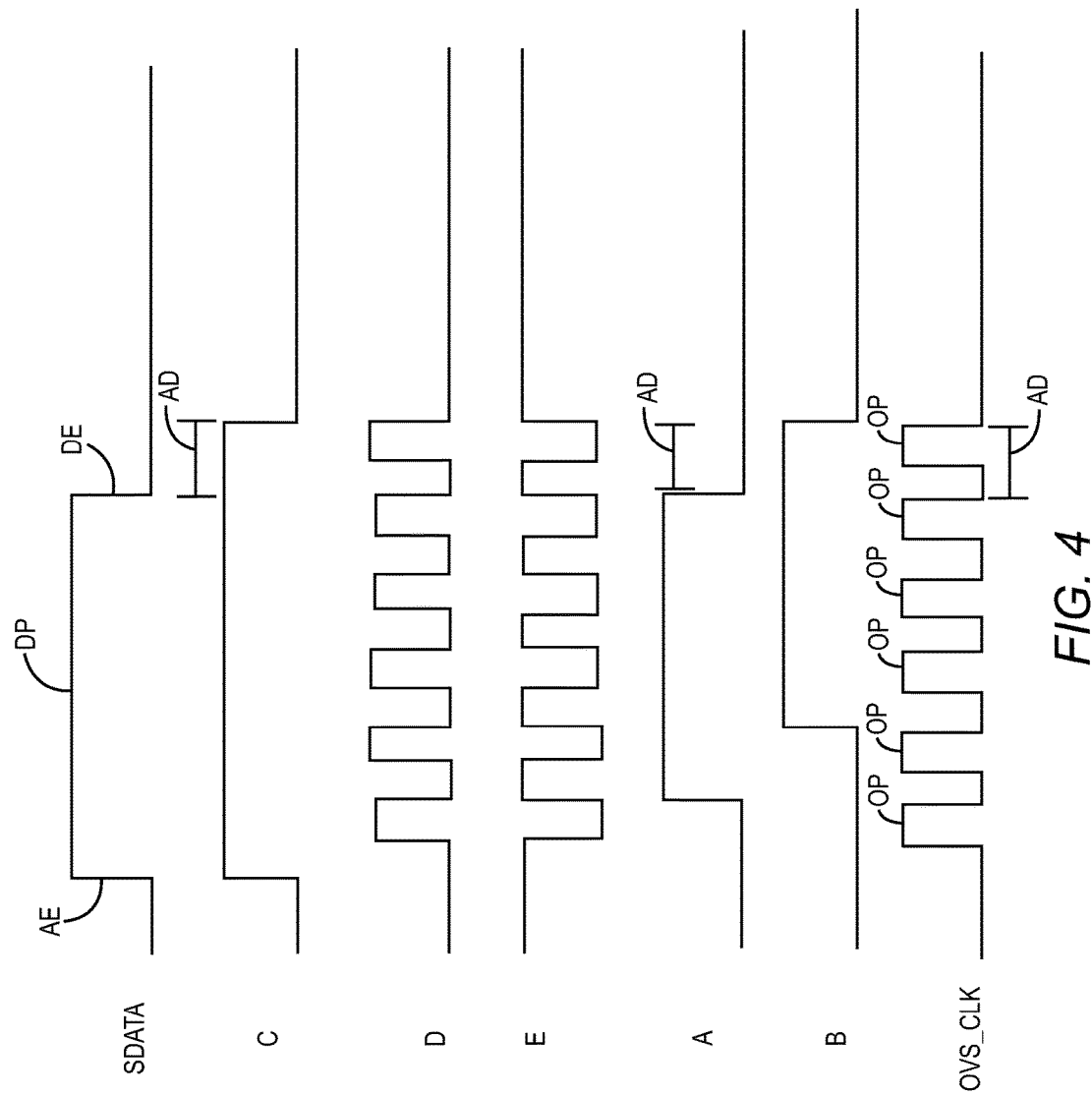
FIG. 4 illustrates an exemplary timing diagram for the oscillator shown in FIG. 3.

Referring now to FIG. 3 and FIG. 4, FIG. 4 illustrates an exemplary timing diagram for the oscillator 14 shown in FIG. 3. The operation of the oscillator 14 is demonstrated for the data pulse DP defined by the input data signal SDATA. Initially, when the input data signal SDATA is low, the capacitor 66 is discharged, and the feedback oscillator signal D is low while the intermediate oscillator signal E is high. At an activation edge AE of the data pulse DP and throughout the data pulse DP, the input terminal 72 of the OR gate 60 rises, and thus the oscillator enable signal C is provided in an activation state. Eventually the capacitor 66 charges enough so that the feedback oscillator signal D also is provided in an activation state. In response, the intermediate oscillator signal E goes low. As such, the capacitor 66 begins to discharge, and eventually the inverter gate 68 provides the intermediate oscillator signal E high. The inverter gate 70 then inverts the intermediate oscillator signal E to generate the oscillator signal OVS_CLK low. The process repeats so that, through the inverter gate 70, the ring oscillator 54 generates the oscillation pulses OP in the oscillation signal OVS_CLK. Note that any number of additional inverter gates may be provided in the ring oscillator 54 to provide an odd number of inversions.

By utilizing the OR gate 60, the input data signal SDATA provides a gated clock that activates and deactivates the ring oscillator 54. However, sampling errors can occur since the input data signal SDATA and the oscillator signal OVS_CLK are not frequency locked. The flip-flops 56, 58 synchronize the input data signal SDATA in accordance with the oscillator signal OVS_CLK and ensure that the oscillator 14 is cleanly deactivated. If the oscillation pulses OP of the oscillator signal OVR_CLK were being provided by sampling the input data signal SDATA, there would be a potential for counter errors on the activation edge AE and the deactivation edge DE of the data pulse DP defined by of the input data signal SDATA. The flip-flops 56, 58 hold the oscillator enable signal C high for a time delay AD to ensure proper synchronization.

After the deactivation edge DE, the delayed data signal A is delayed by the flip-flop 56, and the delayed data signal B has an additional delay due to the flip-flop 58. This provides the oscillator enable signal C in a high state for an additional period AD after the deactivation edge DE. Otherwise, if the OR gate 60 were not provided and the input data signal SDATA were provided directly into the input terminal 78 of the AND gate 62, a narrow glitch could occur in the feedback oscillator signal D. Also, in a worst case scenario without the OR gate, the activation edge AE or the deactivation edge DE of the SDATA is provided during a positive edge of one of the oscillation pulses OP of the oscillation signal OVR_CLK. Since noise can shift the activation edge AE or the deactivation edge DE, this could cause a counter error. If both the activation edge AE and the deactivation edge DE shift, counter errors from 0-2 can result. The OR gate 60 and the flip-flops 56, 58 help ensure that the activation edge AE and the deactivation edge DE are appropriately aligned and that glitches do not occur in the oscillation signal OVR_CLK. In this manner, an appropriate number of the oscillation pulses OP are provided for the data pulse DP.

Figure 5:
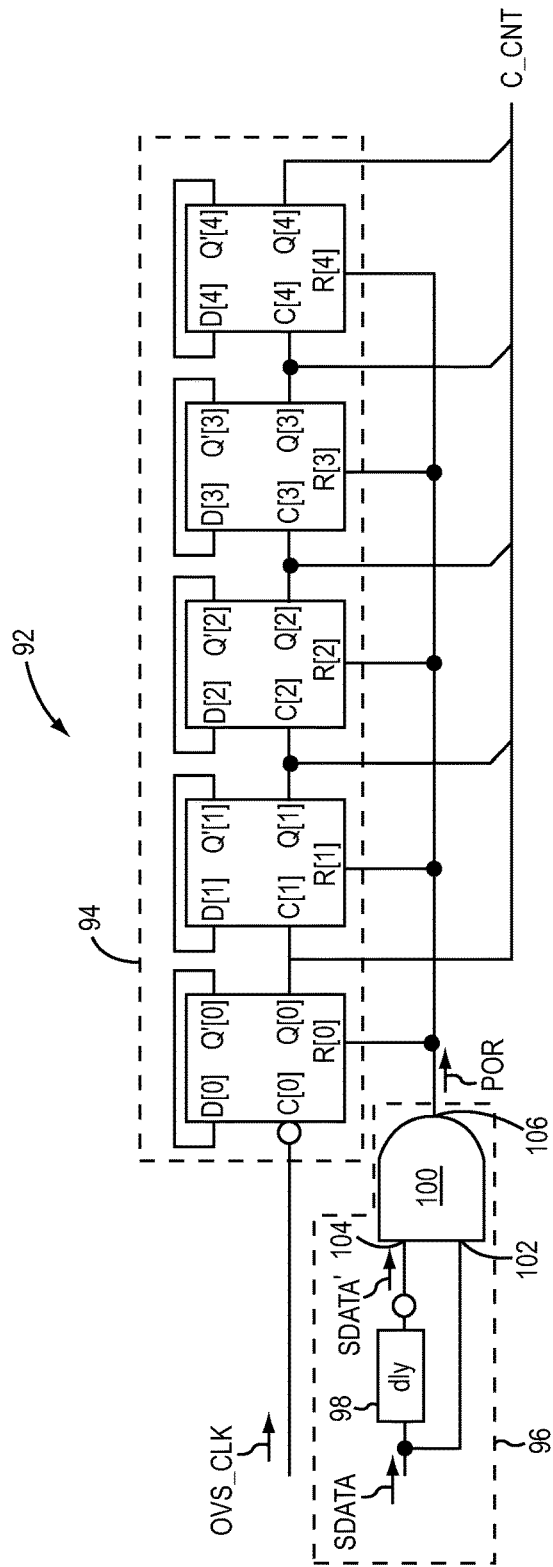
FIG. 5 illustrates one embodiment of a counter, which may be provided within the decoder shown in FIG. 1.

FIG. 5 illustrates one embodiment of a counter 92. The first counter 18 and/or the second counter 20 shown in FIG. 1 may be provided in accordance with the counter 92 shown in FIG. 5. The counter 92 includes a ripple counter 94 and a reset circuit 96. The ripple counter 94 includes flip-flops (referred to generally or generically as elements FF and specifically as elements FF[0]-FF[4]). Each of the flip-flops FF includes a data terminal (referred to generally or generically as elements D and specifically as elements D[0]-D[4]), a non-inverted output terminal (referred to generally or generically as elements Q and specifically as elements Q[0]-Q[4]), an inverted output terminal (referred to generally or specifically as elements Q' and specifically as elements Q'[0]-Q'[4]), a clock terminal (referred to generally or generically as elements C and specifically as elements C[0]-C[4])), and a reset terminal (referred to generally or generically as elements R and specifically as elements R[0]-R[4])).

More specifically, a flip-flop FF[0] includes a data terminal D[0], a non-inverted output terminal Q[0], an inverted output terminal Q'[0], and a reset terminal R[0]. The inverted output terminal Q'[0] is connected to the data terminal D[0]. The reset terminal R[0] is coupled to the reset circuit 96. The clock terminal C[0] is connected to receive an inverted version of the oscillation signal OVS_CLK. A flip-flop FF[1] includes a data terminal D[1], a non-inverted output terminal Q[1], an inverted output terminal Q'[1], and a reset terminal R[1]. The inverted output terminal Q'[1] is connected to the data terminal D[1]. The reset terminal R[1] is coupled to the reset circuit 96. The clock terminal C[1] is connected to the non-inverted output terminal Q[0]. A flip-flop FF[2] includes a data terminal D[2], a non-inverted output terminal Q[2], an inverted output terminal Q'[2], and a reset terminal R[2]. The inverted output terminal Q'[2] is connected to the data terminal D[2]. The reset terminal R[2] is coupled to the reset circuit 96. The clock terminal C[2] is connected to the non-inverted output terminal Q[1]. A flip-flop FF[3] includes a data terminal D[3], a non-inverted output terminal Q[3], an inverted output terminal Q'[3], and a reset terminal R[3]. The inverted output terminal Q'[3] is connected to the data terminal D[3]. The reset terminal R[3] is coupled to the reset circuit 96. The clock terminal C[3] is connected to the non-inverted output terminal Q[2]. Finally, a flip-flop FF[4] includes a data terminal D[4], a non-inverted output terminal Q[4], an inverted output terminal Q'[4], and a reset terminal R[4]. The inverted output terminal Q'[4] is connected to the data terminal D[4]. The reset terminal R[4] is coupled to the reset circuit 96. The clock terminal C[4] is connected to the non-inverted output terminal Q[3]. Each of the flip-flops FF stores a bit of a count parameter C_CNT, which may be the reference parameter SYNC_CNT or the first count parameter BIT_CNT. The ripple counter arrangement of the flip-flops FF allows for the count parameter C_CNT to be incremented for each the oscillation pulses defined by the oscillation signal OVR_CLK.

The reset circuit 96 is configured to generate a reset signal POR that is received by the reset terminal R of each of the flip-flops FF to reset the ripple counter 94. In particular, the reset circuit 96 provides power on reset. As shown in FIG. 5, the reset circuit 96 includes a delay element 98 and an AND gate 100. The AND gate 100 has an input terminal 102 operable to receive the input data signal SDATA. The input data signal SDATA is also received by the delay element 98 that provides a delayed data signal SDATA', which is a delayed and inverted version of the input data signal SDATA. The AND gate 100 is operable to receive the delayed data signal SDATA' at the input terminal 104. The AND gate 100 also includes an output terminal 106. The AND gate 100 is configured to perform an AND operation on the input data signal SDATA and the delayed data signal SDATA' to generate the reset signal POR. Thus, the reset signal POR is high only after the reset circuit 96 is initially turned on by an activation edge of a data pulse and for a temporal period equal approximately to a propagation delay of the delay element 98. Otherwise, the reset signal POR remains low. The propagation delay of the delay element 98 is shorter than an oscillation period of the oscillation pulses defined by the oscillation signal OVS_CLK. This is because the negative edge of the oscillation pulses defined by the oscillation signal OVS_CLK is used. Once the input data signal SDATA goes low, the oscillation signal OVS_CLK is provided in a deactivation state, so the counter 92 will hold its last value of the count parameter C_CNT.

Figure 6:
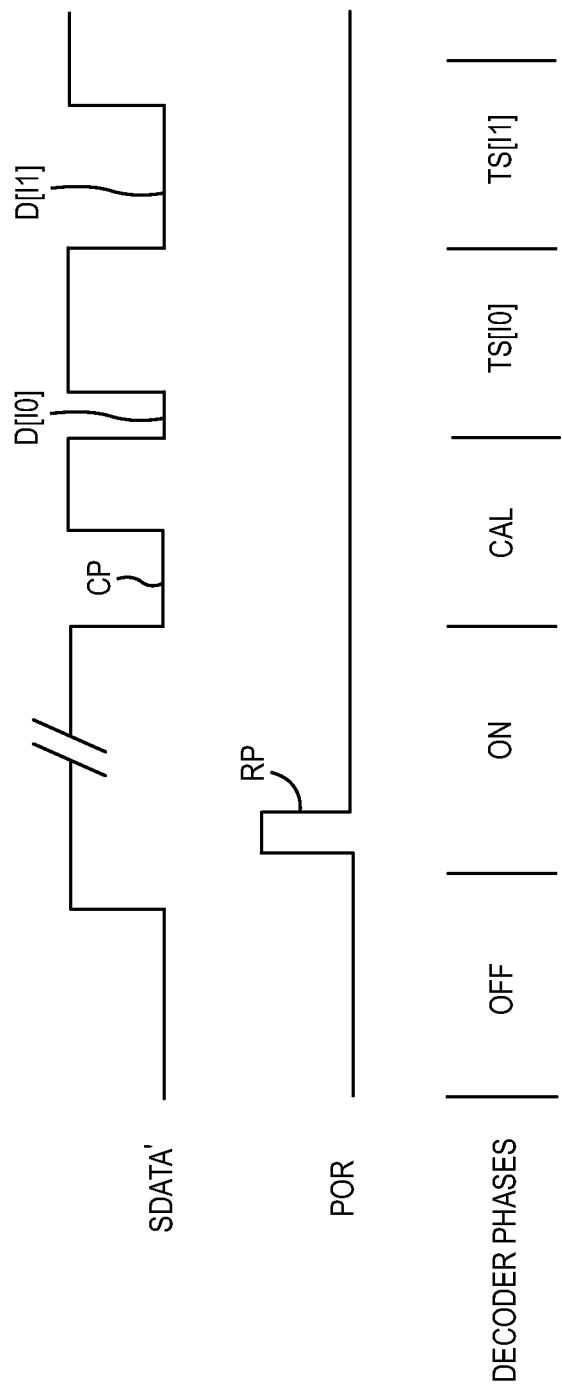
FIG. 6 illustrates a timing diagram for the counter shown in FIG. 5.

FIG. 6 illustrates a timing diagram for the counter 92 shown in FIG. 5. In this embodiment, the delayed input data signal SDATA' is shown, which is inverted with respect to the input data signal SDATA. The reset signal POR is shown for different phases of the decoder 10, including an off state, an on state, a calibration time slot CAL that provides a calibration pulse CP, a data pulse D[I0] that represents a bit value of 0 during a time slot TS[I0], and a data pulse D[I1] that represents a bit value of 1 during a time slot TS[I1]. As shown in FIG. 6, the reset signal POR has a reset pulse RP, which is provided initially when transitioning from the off state and the on state.

As illustrated by the timing diagram in FIG. 6, the counter 92 shown in FIG. 5 uses active high signaling. Note that since the signaling polarity is inverted in the delayed data signal SDATA', the oscillation signal OVS_CLK shown in FIG. 5 triggers the counter 92 when delayed data signal SDATA' is low. With reference to FIG. 6, the oscillation signal OVS_CLK will not be provided when the decoder 10 is in the off state or in the on state. It will only run during the calibration time slot CAL, the time slot TS[I0] and the time slot [I1].

As shown by the delayed data signal SDATA', when the input data signal SDATA pin is held low for a long period of time during the off state, it essentially starves the decoder 10 of power and the decoder turns off. To wake up the slave in the on state, the data input signal SDATA and the delayed input signal SDATA simply go high. This allows for the decoder 10 to be turned on in the on state and triggers the reset pulse RP of the reset signal POR when reaching a nominal voltage threshold. From there, the delayed data signal SDATA' has an opposite polarity of the data input signal SDATA shown in FIG. 2.

Figure 7:
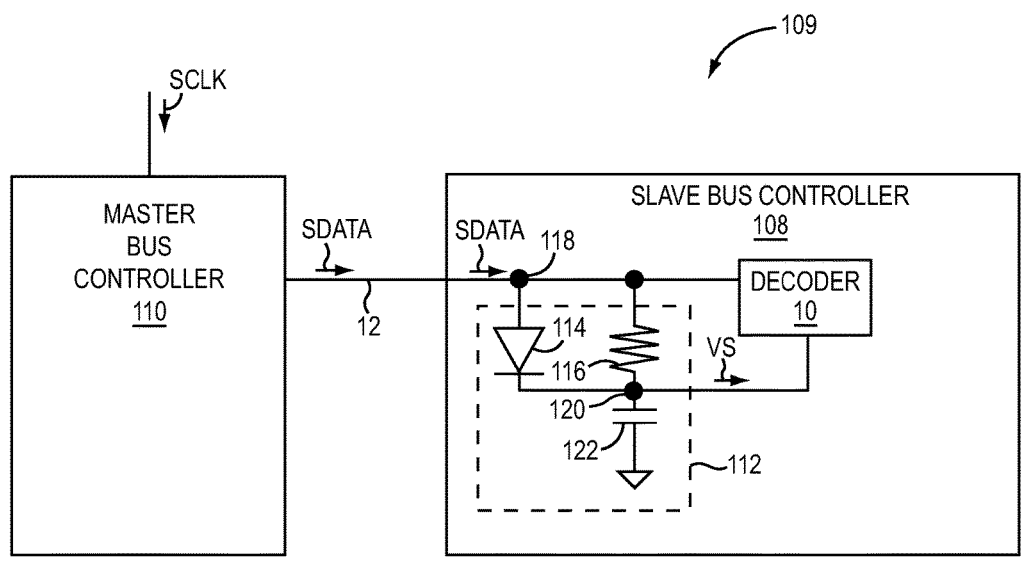
FIG. 7 illustrates an exemplary bus interface system having a slave bus controller, a master bus controller, and a bus line, where the slave bus controller derives power from the input data signal transmitted along the bus line.

FIG. 7 illustrates an exemplary bus interface system 109 having a slave bus controller 108, a master bus controller 110, and the bus line 12, where the slave bus controller 108 derives power from the input data signal SDATA. The master bus controller 110 is configured to generate the input data signal SDATA in accordance with the PWM bus protocol described above. The master bus controller 110 is coupled to the bus line 12 to transmit the input data signal SDATA along the bus line 12 to the slave bus controller 108. The slave bus controller 108 includes the decoder 10 described above with respect to FIG. 1. The slave bus controller 108 is also coupled to the bus line 12 to receive the input data signal SDATA from the master bus controller 110. In this manner, the slave bus controller 108 can recover bits from the input data signal SDATA using the decoder 10 as described above with respect to FIGS. 1 and 2. The slave bus controller 108 also includes power conversion circuitry 112 configured to also receive the input data signal SDATA and convert the input data signal SDATA into a supply voltage VS. More specifically, the supply voltage VS is used to power the decoder 10 in the slave bus controller 108 along with other components. Note that in this embodiment of the bus interface system 109, no other bus line is provided to couple the master bus controller 110 to the slave bus controller 108. Thus, only the bus line 12 is provided to couple the master bus controller 110 to the slave bus controller 108.

While the master bus controller 110 may use the system clock signal SCLK to synchronize the input data signal SDATA, the system clock signal SCLK does not have to be provided to the slave bus controller 108 since the master bus controller 110 generates the input data signal SDATA in accordance with the PWM bus protocol. As a result, the calibration pulse of the data frame is used by the decoder 10 in the slave bus controller 108 to synchronize the data frames and provide calibration as explained with respect to FIGS. 1 and 2 above. Thus, a clock bus line does not have to be provided between the master bus controller 110 and the slave bus controller 108 since the slave bus controller 108 can be synchronized without the system clock signal SCLK. Furthermore, since the power conversion circuitry 112 converts the input data signal SDATA into the supply voltage VS, a power bus line does not have to be provided in order to provide a supply voltage to the slave bus controller 108. Instead, the slave bus controller 108 generates the supply voltage VS from the input data signal SDATA itself. Thus, no other bus line besides the bus line 12 is provided by the bus interface system 109 to couple the master bus controller 110 to the slave bus controller 108.

In this embodiment, the power conversion circuitry 112 includes a diode 114 and a resistor 116 coupled in parallel between a node 118 and a node 120. Both the diode 114 and the resistor 116 receive the input data signal SDATA from the node 118. A capacitor 122 is coupled in shunt to the node 120. The capacitor 122 is charged by the input data signal SDATA to generate the supply voltage VS.

The power conversion circuitry 112 isolates the bus line 12 from the supply voltage VS provided to power the slave bus controller 108. The diode 114 allows for the input data signal SDATA to be pulled low without discharging the supply voltage VS. The resistor 116 does cause a slight pull down of the supply voltage VS. The diode 114 allows for faster charging of the capacitor 122. When the master bus controller 110 pull the input data signal SDATA low to turn off the slave bus controller 108, the resistor 116 discharges the capacitor 122 to turn off the supply voltage VS and the slave bus controller 108.

Figure 8:
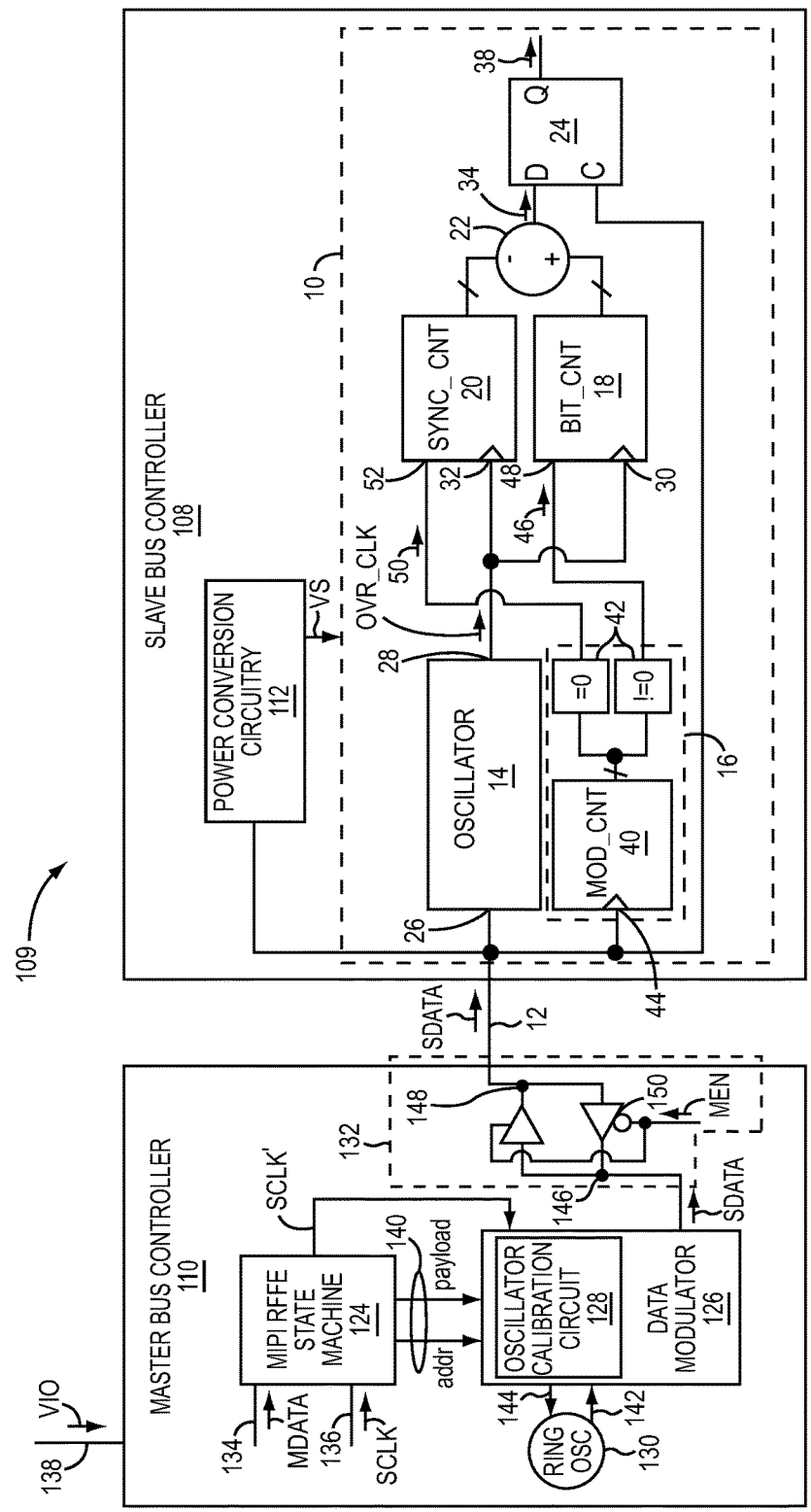
FIG. 8 illustrates another exemplary embodiment of the bus interface system that includes exemplary embodiments of the slave bus controller and the master bus controller, where the master bus controller is a bridge bus controller.

FIG. 8 illustrates another exemplary embodiment of the bus interface system 109 that includes exemplary embodiments of the slave bus controller 108 and the master bus controller 110. The master bus controller 110 is coupled to the bus line 12 to provide the input data signal SDATA and transmit the input data signal SDATA along the bus line 12 to the slave bus controller 108. The slave bus controller 108 includes the decoder 10 described above with respect to FIG. 1 and the power conversion circuitry 112 described above with respect to FIG. 7 that generates the supply voltage VS that powers the decoder 10. The slave bus controller 108 is also coupled to the bus line 12 to receive the input data signal SDATA from the master bus controller 110. In this embodiment, the master bus controller 110 is a bridge bus controller that translates a data frame formatted in accordance with a first bus protocol into the data pulses DP (shown in FIG. 2) defined by the input data signal SDATA during the time slots TS (shown in FIG. 2) of the data frame formatted in accordance with the PWM bus protocol. More specifically, in this embodiment, the master bus controller 110 is configured to translate the payload and the bus address represented by a data frame formatted in accordance with a Mobile Industry Processor Interface (MIPI) bus protocol and translate the payload and the bus address represented by the second data frame into the data pulses DP (shown in FIG. 2) defined by the input data signal SDATA during the time slots TS (shown in FIG. 2) of the data frame formatted in accordance with the PWM bus protocol.

The master bus controller 110 shown in FIG. 8 includes a MIPI Radio Frequency Front End (RFFE) state machine 124, a data modulator 126, an oscillator calibration circuit 128, a ring oscillator 130, and a bidirectional buffer 132. In this embodiment, the oscillator calibration circuit 128 is provided in the data modulator 126. The MIPI RFFE state machine 124 is configured to receive a first bus input, which in this example is a data input signal MDATA formatted in accordance with the MIPI bus protocol. The data input signal MDATA is received on a bus line 134. The data input signal MDATA represents a data frame that includes a bus address and a payload formatted in accordance with the MIPI bus protocol. To synchronize the master bus controller 110, the master bus controller 110 also receives the system clock signal SCLK on a bus line 136. Furthermore, the master bus controller 110 receives a supply voltage VIO along a bus line 138. The MIPI RFFE state machine is configured to extract the bus address and the payload from the data frame represented using the input data signal MDATA and generate a digital output 140 that transfers the bus address and the payload to the data modulator 126. The data modulator 126 is configured to obtain the bus address and payload extracted from the data input signal MDATA and provide the bus address and payload to a data frame formatted in accordance with the PWM bus protocol. The data modulator 126 is synchronized using the ring oscillator 130, which in this example is a digitally controlled oscillator (DCO). The ring oscillator 130 is configured to generate an oscillator signal 142. The ring oscillator 130 is relatively cheap. The oscillator calibration circuit is configured to calibrate the ring oscillator 130 based on the system clock signal SCLK. In this embodiment, the MIPI RFFE state machine 124 is configured to generate a calibration clock signal SCLK' by dividing down the system clock signal SCLK. The oscillator calibration circuit 128 is operable to receive the calibration clock signal SCLK' and generate a control output 144 that synchronizes the oscillator signal 142 in accordance with the calibration clock signal SCLK'.

The data modulator 126 is operable to receive the oscillator signal 142 and is configured to generate the input data signal SDATA such that the data pulses DP (shown in FIG. 2) of the input data signal SDATA are synchronized by the oscillator signal 142. Since the oscillator signal 142 was synchronized based on the system clock signal SCLK (e.g., in this embodiment, in accordance with the calibration clock signal SCLK' generated from the system clock signal SCLK), the timing accuracy of the oscillator signal 142 is maintained. As shown in FIG. 8, the bidirectional buffer 132 has an input terminal 146 that receives the SDATA signal and an output terminal 148 that provides the input data signal SDATA to the bus line 12. The output terminal 148 is coupled to the bus line 12, which is connected to the slave bus controller 108. However, the bidirectional buffer 132 also includes an input terminal 150 that is operable to receive an enable signal MEN. When the enable signal MEN is in an activated state, the bidirectional buffer 132 is configured to transmit the input data signal SDATA along the bus line 12. Otherwise, when the enable signal MEN is in a deactivation state, the bidirectional buffer 132 does not transmit the input data signal SDATA along the bus line 12 but rather allows the master bus controller 110 to receive data signals from slave controllers connected to the bus line 12. The enabling signal MEN may be generated by the data modulator 126 and may activate the bidirectional buffer 132 when the slave bus controller 108 (shown in FIG. 7) is not pulling down the bus line 12. Since the slave bus controller 108 is synchronized with the data pulse DP[0] (i.e., the calibration pulse), and the power conversion circuitry 112 converts the input data signal SDATA into the supply voltage VS, the master bus controller 110 and the slave bus controller 108 are only connected by the bus line 12. No other bus lines are needed.

Figure 9:
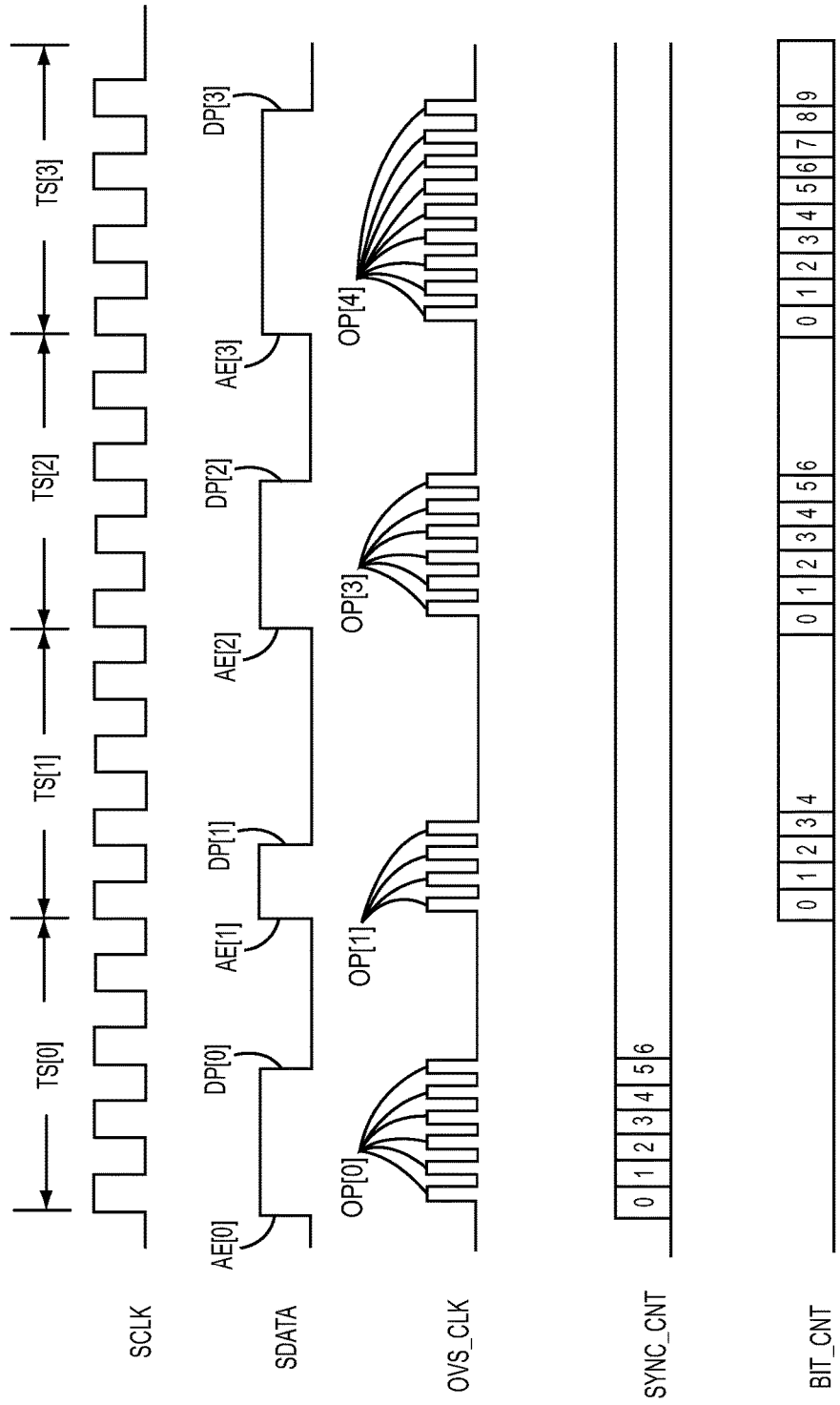
FIG. 9 illustrates a timing diagram for the bus interface system shown in FIG. 8 during an exemplary data frame provided in accordance to a one wire PWM bus protocol.

Referring now to FIG. 8 and FIG. 9, FIG. 9 illustrates a timing diagram for the bus interface system 109 shown in FIG. 8 during an exemplary data frame provided in accordance to another one wire PWM bus protocol. FIG. 9 includes an exemplary illustration of the input data signal SDATA, the system clock signal SCLK, the oscillation signal OVS_CLK, the reference parameter SYNC_CNT, and the first count parameter BIT_CNT as provided throughout the data frame. In this embodiment, the PWM bus protocol is provided so that the data pulses DP[1]-DP[3] represents any one of a set of logical values. More specifically, the data pulses DP[1]-DP[3] can represent any one of a set of three logical symbols, such as a logical symbol "0," a logical symbol "1," and a logical symbol "2." The master bus controller 110 is configured to generate the input data signal SDATA, which is synchronized based on the system clock signal SCLK, as described above. Again, in this embodiment, the data pulse DP[0] is the calibration pulse provided during the time slot TS[0], which is the calibration time slot. In this example, the data pulse DP[0] is provided by the master bus controller 110 for two clock periods of the system clock signal SCLK. The master bus controller 110 generates the data pulses DP[1]-DP[3] with logical symbols representing a bus address and a payload using the ring oscillator 130, as explained above with respect to FIG. 8.

With respect to the slave bus controller 108, the oscillator 14 in the decoder 10 is configured to be enabled by the data pulse DP[0], which is the calibration pulse provided during the calibration time slot (i.e., TS[0]). The second counter 20 may be configured to reset the reference parameter SYNC_CNT to an initial value of zero (0) in response to an activation edge AE[0] of the data pulse DP[0]. The second counter 20 is configured to count the oscillation pulses OP[0] defined by the oscillation signal OVR_CLK during the time slot TS[0] as a result of the data pulse DP[0] (the calibration pulse). More specifically, the second counter 20 is configured to increment the reference parameter SYNC_CNT as a result of each of the oscillation pulses OP[0] defined by the oscillation signal OVR_CLK during the time slot TS[0]. In this example, the reference parameter SYNC_CNT is set equal to a reference number of six (6) as a result of the six oscillation pulses OP[0] generated as a result of the data pulse DP[0] during the time slot TS[0]. As a result of the end of the data pulse DP[0], no more of the oscillation pulses OP[0] are generated, and the oscillation signal OVS_CLK is held in a deactive state for a remainder of the time slot TS[0]. Accordingly, the reference parameter SYNC_CNT indicates the reference number of six (6), which is how many of the oscillation pulses OP[0] were generated by the oscillator 14 during the time slot TS[0] (i.e., the calibration time slot) as a result of the data pulse DP[0] (i.e., the calibration pulse).

With respect to the second time slot TS[1], the counter enabling circuitry 16 is configured to enable the first counter 18 and disable the second counter 20. As such, the second counter 20 holds the reference parameter SYNC_CNT at the reference number of six (6). The oscillator 14 is configured to be enabled by the data pulse DP[1]. The first counter 18 may be configured to reset the first count parameter BIT_CNT to an initial value of zero (0) in response to an activation edge AE[1] of the data pulse DP[1]. The first counter 18 is configured to count the oscillation pulses OP[1] defined by the oscillation signal OVR_CLK during the time slot TS[1] as a result of the data pulse DP[1], which has a 25% duty cycle.

More specifically, the first counter 18 is configured to increment the first count parameter BIT_CNT as a result of each of the oscillation pulses OP[1] defined by the oscillation signal OVR_CLK during the time slot TS[1]. In this example, the first count parameter BIT_CNT is set equal to a number of four (4) as a result of the four oscillation pulses OP[1] generated as a result of the data pulse DP[1] during the time slot TS[1]. As a result of the end of the data pulse DP[1], no more of the oscillation pulses OP[1] are generated and the oscillation signal OVS_CLK is held in a deactive state for a remainder of the time slot TS[1]. Accordingly, the first count parameter BIT_CNT indicates a number of four (4), which is how many of the oscillation pulses OP[1] were generated by the oscillator 14 during the time slot TS[1] as a result of the data pulse DP[1]. The comparison circuit 22 then subtracts the reference parameter SYNC_CNT from the first count parameter BIT_CNT. Since four (4) minus six (6) is negative, the comparison circuit 22 generates the data output 34 so that the data output 34 represents a logical symbol "0."

With respect to the time slot TS[2], the counter enabling circuitry 16 is configured to enable the first counter 18 and disable the second counter 20. As such, the second counter 20 holds the reference parameter SYNC_CNT at the reference number of six (6). The oscillator 14 is configured to be enabled by the data pulse DP[2]. The first counter 18 may be configured to reset the first count parameter BIT_CNT to an initial value of zero (0) in response to an activation edge AE[2] of the data pulse DP[2]. The first counter 18 is configured to count the oscillation pulses OP[2] defined by the oscillation signal OVR_CLK during the time slot TS[2] as a result of the data pulse DP[2], which has a 50% duty cycle.

More specifically, the first counter 18 is configured to increment the first count parameter BIT_CNT as a result of each of the oscillation pulses OP[2] defined by the oscillation signal OVR_CLK during the time slot TS[2]. In this example, the first count parameter BIT_CNT is set equal to a number of six (6) as a result of the six oscillation pulses OP[2] generated as a result of the data pulse DP[2] during the time slot TS[2]. As a result of the end of the data pulse DP[2], no more of the oscillation pulses OP[2] are generated, and the oscillation signal OVS_CLK is held in a deactive state for a remainder of the time slot TS[2]. Accordingly, the first count parameter BIT_CNT indicates a number of six (6), which is how many of the oscillation pulses OP[2] were generated by the oscillator 14 during the time slot TS[2] (i.e., the first address time slot) as a result of the data pulse DP[2]. The comparison circuit 22 then subtracts the reference parameter SYNC_CNT from the first count parameter BIT_CNT. Since six (6) minus six (6) is zero, the comparison circuit 22 generates the data output 34 so that the data output 34 represents a logical symbol of "1."

With respect to the time slot TS[3], the counter enabling circuitry 16 is configured to enable the first counter 18 and disable the second counter 20. As such, the second counter 20 holds the reference parameter SYNC_CNT at the reference number of six (6). The oscillator 14 is configured to be enabled by the data pulse DP[3]. The first counter 18 may be configured to reset the first count parameter BIT_CNT to an initial value of zero (0) in response to an activation edge AE[3] of the data pulse DP[3]. The first counter 18 is configured to count the oscillation pulses OP[3] defined by the oscillation signal OVR_CLK during the time slot TS[3] as a result of the data pulse DP[3] which has a 75% duty cycle.

More specifically, the first counter 18 is configured to increment the first count parameter BIT_CNT as a result of each of the oscillation pulses OP[3] defined by the oscillation signal OVR_CLK during the time slot TS[3]. In this example, the first count parameter BIT_CNT is set equal to a number of nine (9) as a result of the nine oscillation pulses OP[3] generated as a result of the data pulse DP[3] during the time slot TS[3]. As a result of the end of the data pulse DP[3], no more of the oscillation pulses OP[3] are generated, and the oscillation signal OVS_CLK is held in a deactive state for a remainder of the time slot TS[3]. Accordingly, the first count parameter BIT_CNT indicates a number of nine (9), which is how many of the oscillation pulses OP[3] were generated by the oscillator 14 during the time slot TS[3] as a result of the data pulse DP[3]. The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a logical symbol of "2."

Figure 10:
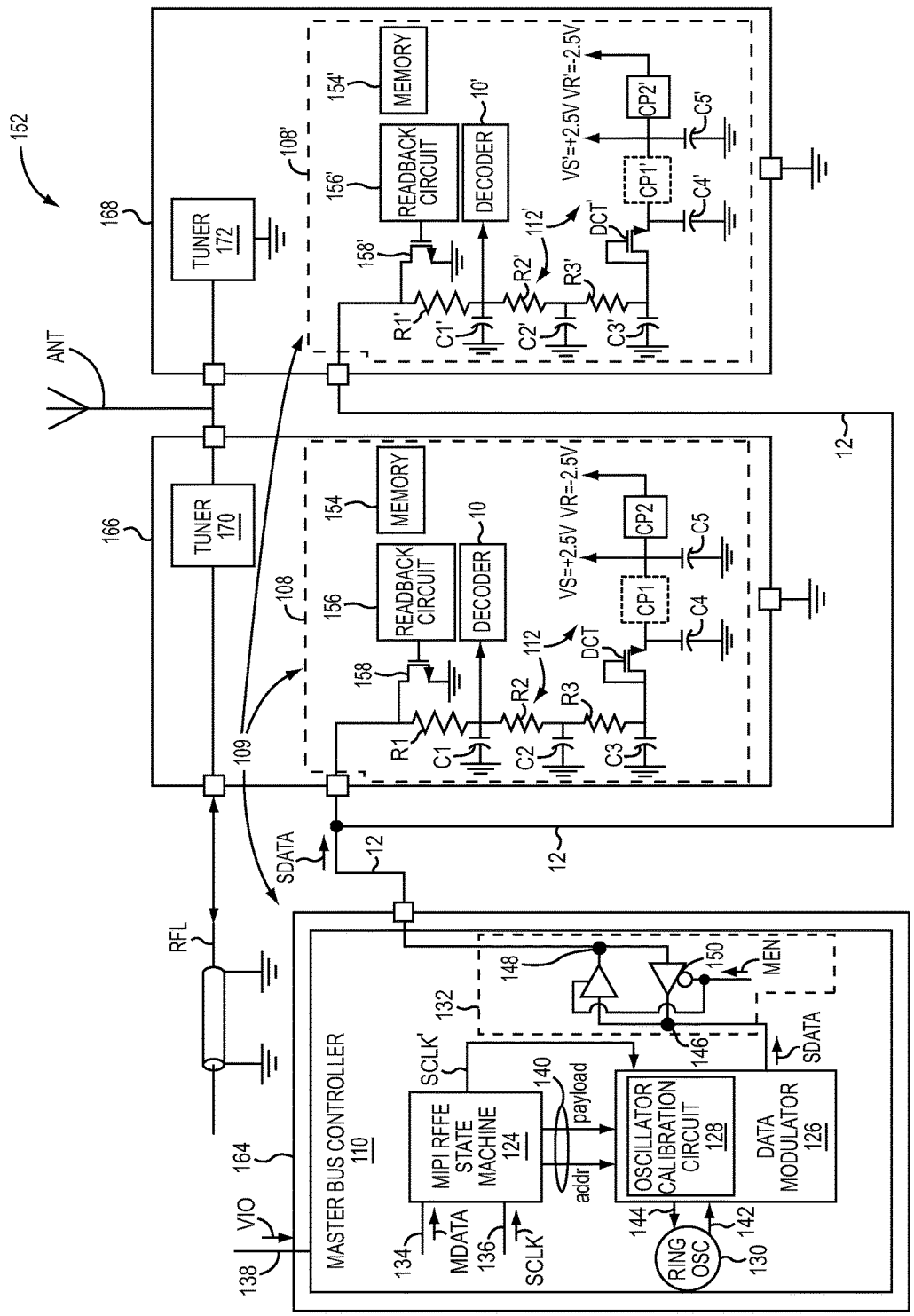
FIG. 10 illustrates another exemplary embodiment of the bus interface system that includes a master bus controller and slave bus controllers coupled in a daisy chain along the bus line.

FIG. 10 illustrates another exemplary embodiment of the bus interface system 109, which is provided in a radio frequency (RF) front end module 152. The bus interface system 109 includes an embodiment of the master bus controller 110, an embodiment of the slave bus controller 108, and another slave bus controller 108'. The slave bus controller 108' is coupled to the bus line 12 such that the slave bus controller 108 and the slave bus controller 108' are coupled in a daisy chain along the bus line 12. In this manner, the slave bus controller 108' also receives the input data signal SDATA from the master bus controller 110. In this embodiment, the slave bus controller 108 includes a memory device 154 that stores information receives on the bus line 12 and can be used to write information on the bus line 12. A readback circuit 156 is configured to control a pull up transistor 158 in order to write bits onto the bus line 12. The slave bus controller 108 includes the decoder 10, which was described with respect to FIG. 1.

In addition, the slave bus controller 108 also includes another embodiment of the power conversion circuitry 112. In this embodiment, the power conversion circuitry includes shunt coupled capacitors C1, C2, C3, C4, C5, series connected resistors R1, R2, R3, a diode connected transistor DCT, a charge pump CP1, and a charge pump CP2. The shunt coupled capacitors C1, C2, C3, C4, C5, series connected resistors R1, R2, R3, and series connected transistors provide the appropriate RC constant to convert the input data signal SDATA into the supply voltage VS and a supply voltage VR. In this embodiment, the charge pump CP1 is a positive charge pump that generates the supply voltage at approximately +2.5V. The charge pump CP2 is a negative charge pump that generates the supply voltage VR at approximately –2.5V. The supply voltage VS and the supply voltage VR are provided to power the decoder 10 and readback circuit 156 of the slave bus controller 108.

In this embodiment, the slave bus controller 108' is identical to the slave bus controller 108. Thus, a decoder 10', a memory device 154', a readback circuit 156' a pull up transistor 158', a power conversion circuitry 112', shunt coupled capacitors C1', C2', C3', C4', C5', series connected resistors R1', R2', R3', a diode connected transistor DCT', a charge pump CP1', and a charge pump CP2' of the slave bus controller 108' are identical to the decoder 10, the memory device 154, the readback circuit 156, the pull up transistor 158, the power conversion circuitry 112, the shunt coupled capacitors C1, C2, C3, C4, C5, the series connected resistors R1, R2, R3, the diode connected transistor DCT, the charge pump CP1, and the charge pump CP2, respectively of the slave bus controller 108.

The master bus controller 110 is formed as an integrated circuit (IC) within an IC package 164. Similarly, the slave bus controller 108 is formed as an IC within an IC package 166 and the slave bus controller 108' is formed as an IC with an IC package 168. The IC packages 164, 166, 168 connect the master bus controller 110 and the slave bus controller 108, 108' in a daisy chain along the bus line 12. This arrangement thus reduces interconnections, and thus the slave bus controllers 108, 108' are provided with other circuitry of the RF front end module. More specifically, the IC package 166 includes a tuner 170 connected to an antenna ANT along an RF line RFL. The IC package 168 also includes a tuner 172 connected to the antenna ANT along the RF line RFL. In this example, the master bus controller 110 may be include with a cellular baseband chipset in a dedicated phone compartment and the slave bus controllers 108, 108' reside in close to the antenna ANT. Reducing interconnections helps reduce costs and increase reliability.

Figure 11:
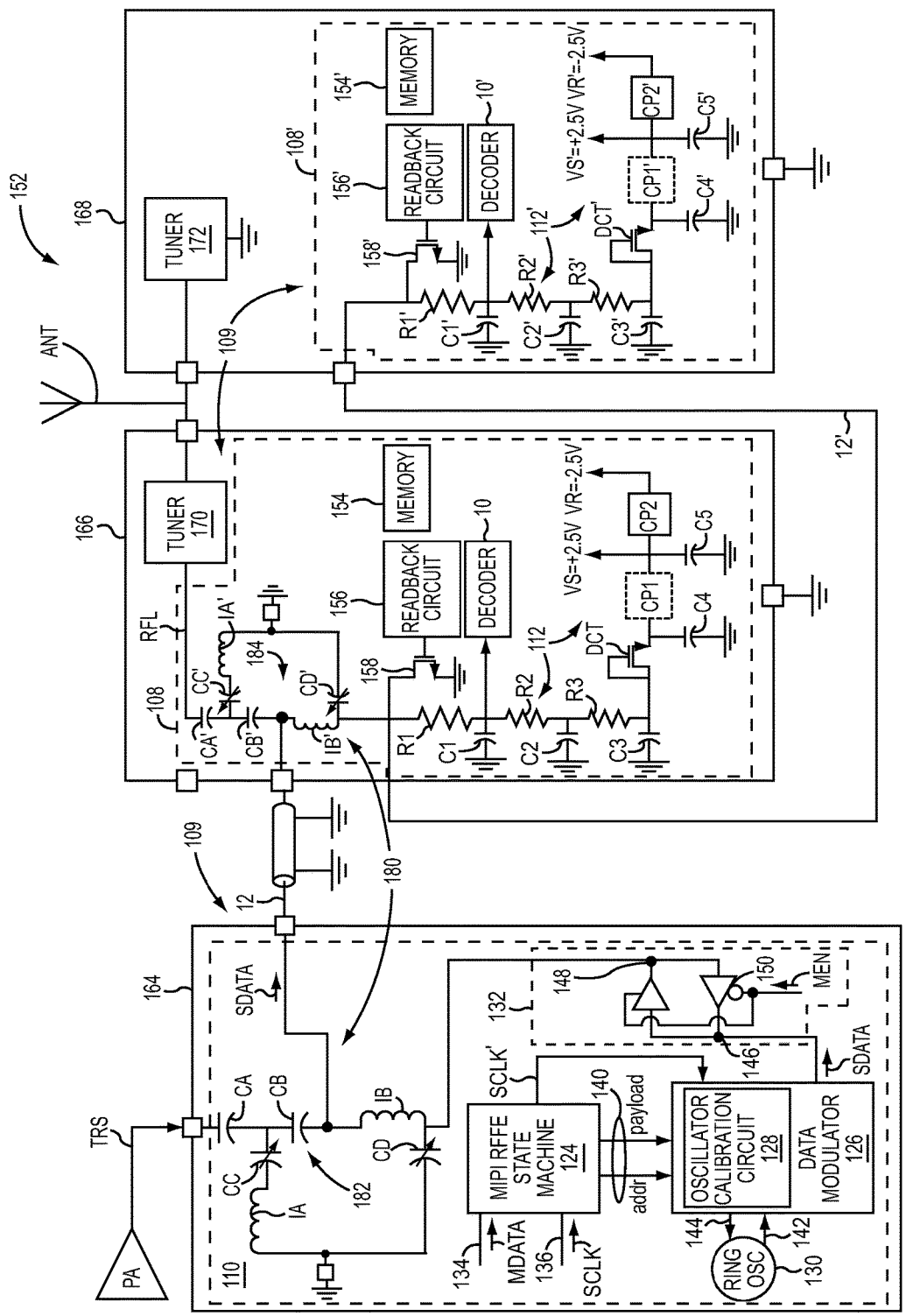
FIG. 11 illustrates another exemplary embodiment of the bus interface system that includes a master bus controller and slave bus controllers with a diplexer that reduces transmit injections along the bus line.

FIG. 11 illustrates another exemplary embodiment of the bus interface system 109, which is provided in another embodiment of the RF front end module 152. The master bus controller 110, the slave bus controller 108, and the slave bus controller 108' are the same as the embodiments shown in FIG. 10 except that, in this embodiment, the slave bus controller 108 and the slave bus controller 108' are connected by a bus line 12'. Furthermore, a diplexer 180 is provided to deal with transmit injection onto the bus line 12 and the bus line 12' resulting from a transmit signal TRS amplified by the power amplifier PA in the RF front end module 152. The RF transmit signal TRS propagates along the RF line RFL. The diplexer 180 includes a first RF filter 182 and a second RF filter 184. The master bus controller 110 includes the first RF filter 182. The slave bus controller 108 includes the second RF filter 184.

The RF transmit signal TRS is diplexed onto the wire in the master bus controller 110 and to the wire in the slave bus controller 108. As such, the RF transmit signal TRS needs to be passed with as little loss and noise as possible. The first RF filter 182 and the second RF filter 184 prevent bus noise from entering the bus lines 12, 12', the master bus controller 110, the slave bus controller 108, and the slave bus controller 108' from entering the RF line RFL and the RF transmit signal TRS. The bus line 12 is connected between the first RF filter 182 and the second RF filter 184. The bus line 12' is connected between the pull up transistor 158 and resistor R1 in the slave bus controller 108 and is connected between the pull up transistor 158' and resistor R1' in the slave bus controller 108'.

The first RF filter 182 includes capacitors CA, CB, variable capacitive structure CC, CD, inductor IA, and inductor IB. The capacitor CA is coupled in series to provide matching to the RF line RFL. The variable capacitive structure CC and the inductor IA are series coupled to form a series resonator connected in shunt. The capacitor CB, variable capacitive structure CC, and the inductor IA form a high pass filter that blocks energy from the communications bus activity from getting back to RF sections. The variable capacitive structure CD and the inductor IB are coupled in series to form another series resonator. The variable capacitive structure CD and the inductor IB form a low pass filter that blocks RF energy from getting to the data modulator 126. This low pass filter reduces RF levels at the output terminal 148 of the bidirectional buffer 132 from entering the master bus controller 110. The variable capacitive structures CC and CD may each be a programmable array of capacitors. Any other suitable variable capacitive structure may also be used such as varactors. In this manner, the first RF filter 182 can be tuned.

The second RF filter 184 includes capacitors CA', CB', variable capacitive structure CC', CD', inductor IA', and inductor IB'. The bus line 12 is connected to first RF filter 182 between the capacitor CB and the inductor IB and is connected to the second RF filter 184 between the capacitor CB' and the inductor IB'. The capacitor CA' is coupled in series to provide matching to the RF line RFL. The variable capacitive structure CC' and the inductor IA' are series coupled to form a series resonator connected in shunt. The capacitor CB', variable capacitive structure CC', and the inductor IA' form a high pass filter that blocks energy from the communications bus activity from getting back to RF sections. The variable capacitive structure CD' and the inductor IB' are coupled in series to form another series resonator. The series resonator formed by the variable capacitive structure CD' and the inductor IB' are connected in series to the other components of the slave bus controller 108. The variable capacitive structure CD' and the inductor IB' form a low pass filter that blocks RF energy from getting to the slave bus controller 108 and the slave bus controller 108' through the bus line 12'. The variable capacitive structures CC' and CD' may each be a programmable array of capacitors. Any other suitable variable capacitive structure may also be used such as varactors. In this manner, the second RF filter 184 can be tuned. The diplexer 180 may be tuned to have an elliptical response (Cauer characteristic response) such that the first RF filter 182 and the second RF filter 184 can be tuned for optimal selectivity at a signal frequency of the RF transit signal TRS.

Those skilled in the art will recognize improvements and modifications to the preferred embodiments of the present disclosure. All such improvements and modifications are considered within the scope of the concepts disclosed herein and the claims that follow.

What is claimed is:

1. A decoder comprising:
    an oscillator operable to receive an input data signal that defines a data pulse during a time slot, wherein the oscillator is configured to be enabled by the data pulse of the input data signal and generate oscillation pulses while enabled;
    a first counter operable to store a first count parameter, wherein the first counter is configured to count the oscillation pulses such that the first count parameter indicates a number of the oscillation pulses generated during the time slot; and
    a comparison circuit configured to compare the first count parameter with a reference parameter that indicates a reference number and generate a data output such that the data output represents a first logical value in response to the first count parameter being greater than the reference parameter and such that the data output represents a second logical value in response to the first count parameter being less than the reference parameter.

2. The decoder of claim 1 further comprising a second counter wherein:
    the oscillator is operable to receive the input data signal that defines a calibration pulse during a calibration time slot and is configured to be enabled by the calibration pulse; and
    the second counter operable to store the reference parameter, wherein the second counter is configured to count the oscillation pulses such that the reference parameter indicates the reference number so that the reference number is based on how many of the oscillation pulses were generated by the oscillator during the calibration time slot.

3. The decoder of claim 2 wherein:
    the second counter is configured to count the oscillation pulses when enabled; and
    counter enabling circuitry is configured to enable the second counter during the calibration time slot.

4. The decoder of claim 3 wherein the counter enabling circuitry comprises:
    a modulo counter operable to store a modulo counter parameter and to receive the input data signal, wherein the modulo counter is configured to increment the modulo counter parameter in response to the calibration pulse and the data pulse; and
    a logical network configured to disable the first counter and enable the second counter such that the second counter counts the oscillation pulses if the modulo counter parameter is equal to a calibration number that indicates the calibration time slot and disable the second counter and enable the first counter such that the first counter counts the oscillation pulses if the modulo counter parameter is not equal to the calibration number.

5. The decoder of claim 2 wherein a duty cycle of the calibration pulse is approximately 50% with regards to the calibration time slot.

6. The decoder of claim 1 wherein the oscillator is operable to receive the input data signal that defines data pulses during a plurality of time slots and wherein:
- each of the data pulses are provided during a different one of the plurality of time slots;
- the data pulses include the data pulse;
- the plurality of time slots include the time slot; and
- the oscillator is configured to generate the oscillation pulses when enabled at a first pulse rate that is at least three times greater than a second pulse rate of the data pulses.

7. The decoder of claim 1 wherein the comparison circuit is configured to generate the data output as a data output signal such that the data output signal represents a first output bit with the first logical value being a first bit value and the second logical value being a second bit value.

8. The decoder of claim 7 further comprising a sequential state element configured to receive the data output signal and store the first output bit.

9. The decoder of claim 1 wherein the comparison circuit comprises a subtractor that is configured to compare the first count parameter with the reference parameter by subtracting the first count parameter and the reference parameter.

10. The decoder of claim 1 wherein the comparison circuit is further configured to generate the data output such that the data output represents a third logical value in response to the first count parameter being equal to the reference parameter.

11. The decoder of claim 1 wherein the comparison circuit is further configured to generate the data output such that the first logical value is a first logical symbol and the second logical value is a second logical symbol.

12. The decoder of claim 1 wherein the comparison circuit is further configured to generate the data output such that the data output represents a third logical symbol in response to the first count parameter being equal to the reference parameter.

13. The decoder of claim 1 wherein the oscillator comprises a ring oscillator.

14. The decoder of claim 13 wherein the ring oscillator includes an OR gate having a first input terminal coupled to receive the input data signal, a second input terminal, and a first output terminal, the ring oscillator further comprising:
- a plurality of flip-flops coupled sequentially with one another such that the plurality of flip-flops are configured to receive the input data signal and generate a delayed data signal, wherein the plurality of flip-flops are coupled to provide the delayed data signal to the second input terminal of the OR gate.

15. The decoder of claim 14 wherein the plurality of flip-flops are operably associated so as to be clocked by the ring oscillator.

16. The decoder of claim 15 wherein the ring oscillator further comprises an inverter gate and an AND gate wherein:
- the AND gate has a third input terminal, a fourth input terminal, and a second output terminal;
- the inverter gate has a fifth input terminal and a third output terminal;
- the third input terminal of the AND gate is coupled to the first output terminal of the OR gate;
- the fourth input terminal of the AND gate is connected to the third output terminal of the inverter gate; and
- the second output terminal of the AND gate is connected to the fifth input terminal of the inverter gate.

17. The decoder of claim 1 wherein the first counter comprises a ripple counter.

18. The decoder of claim 17 wherein the first counter further comprises a reset circuit configured to reset the ripple counter based on the input data signal.

19. A method of decoding data comprising:
- receiving an input data signal that defines a data pulse during a time slot;
- enabling an oscillator to generate oscillation pulses while the data pulse is provided by the input data signal;
- counting a number of the oscillation pulses generated during the time slot;
- comparing the number of the oscillation pulses generated during the time slot with a reference number;
- generating a data output so that the data output represents a first logical value in response to the number of the oscillation pulses generated during the time slot being greater than the reference number; and
- generating the data output so that a second logical value in response to the number of the oscillation pulses generated during the time slot being less than the reference number.

20. The method of claim 19 further comprising;
- receiving the input data signal defining a calibration pulse during a calibration time slot that is prior to the time slot; and
- counting the oscillation pulses such that the reference number is based on how many of the oscillation pulses were generated by the oscillator during the calibration time slot.

21. A bus interface system, comprising:
- a bus line;
- a master bus controller coupled to the bus line;
- a slave bus controller coupled to the bus line, wherein the slave bus controller comprises a decoder that includes:
  - an oscillator coupled to the bus line so as to receive an input data signal that defines a data pulse during a time slot, wherein the oscillator is configured to be enabled by the data pulse of the input data signal and generate oscillation pulses while enabled;
  - a first counter operable to store a first count parameter, wherein the first counter is configured to count the oscillation pulses such that the first count parameter indicates a number of the oscillation pulses generated during the time slot; and
  - a comparison circuit configured to compare the first count parameter with a reference parameter that indicates a reference number and generate a data output such that the data output represents a first logical value in response to the first count parameter being greater than the reference parameter and such that the data output represents a second logical value in response to the first count parameter being less than the reference parameter.

22. The bus interface system of claim 21 wherein:
- the master bus controller is configured to generate the input data signal and transmit the input data signal to the slave bus controller along the bus line; and
- no other bus line is provided to couple the master bus controller to the slave bus controller.

23. The bus interface system of claim 21 wherein the slave bus controller further comprises power conversion circuitry configured to also receive the input data signal and convert the input data signal into a supply voltage.

24. The bus interface system of claim 23 wherein the slave bus controller is configured to power the decoder with the supply voltage.

25. The bus interface system of claim 21 wherein the master bus controller is configured to receive a clock signal and further comprises:
- a second oscillator configured to generate an oscillator signal;
- a data modulator operable to receive the oscillator signal, wherein the data modulator is configured to generate the input data signal such that the input data signal is synchronized by the oscillator signal; and
- an oscillator calibration circuit configured to calibrate the second oscillator based on the clock signal.

26. The bus interface system of claim 21 wherein the master bus controller is configured to generate the input data signal so as to represent a first data frame with a set of data pulses during a set of time slots and wherein:
- the set of data pulses include the data pulse;
- the set of time slots include the time slot;
- for the first data frame, each one of the set of data pulses is provided during a different one of the set of time slots of the first data frame; and
- the oscillator is configured to be enabled by each of the set of data pulses.

27. The bus interface system of claim 26 wherein the master bus controller comprises a bridge bus controller operable to receive a first bus input that represents a second data frame having a payload and a bus address, wherein the bridge bus controller is configured to translate the payload and the bus address represented by the second data frame into the set of data pulses provided during the set of time slots of the first data frame.

28. The bus interface system of claim 27 wherein the bridge bus controller is configured to translate the payload and the bus address represented by the second data frame when the second data frame is formatted in accordance with a Mobile Industry Processor Interface (MIPI) bus protocol.

29. The bus interface system of claim 21 further comprising a second slave bus controller coupled to the bus line such that the slave bus controller and the second slave bus controller are coupled in a daisy chain along the bus line.

30. The bus interface system of claim 21 further comprising a diplexer having a first RF filter coupled to the bus line and a second RF filter coupled to the bus line and wherein:
- the master bus controller includes the first RF filter; and
- the slave bus controller includes the second RF filter.

* * * * *